(12) United States Patent
Sanzo et al.

(10) Patent No.: US 6,512,353 B2
(45) Date of Patent: Jan. 28, 2003

(54) SYNCHRONIZED, RIPPLE INDEPENDENT WINDOW COMPARATOR FOR SWITCH-MODE POWER CONVERTERS

(75) Inventors: Christopher J. Sanzo, Providence, RI (US); Claudio Tuozzolo, Johnston, RI (US)

(73) Assignee: Sipex Corporation, Billerica, MA (US)

(*) Notice: Subject to any disclaimer, the term of this patent is extended or adjusted under 35 U.S.C. 154(b) by 0 days.

(21) Appl. No.: 09/879,427

(22) Filed: Jun. 12, 2001

(65) Prior Publication Data

US 2002/0039018 A1 Apr. 4, 2002

Related U.S. Application Data

(60) Provisional application No. 60/217,949, filed on Jul. 13, 2000.

(51) Int. Cl.[7] .................................................. G05F 1/40
(52) U.S. Cl. ................................... 323/284; 323/287
(58) Field of Search ............................ 323/284, 207, 323/275, 285, 222, 266, 281; 363/34, 89, 21.01, 37; 327/266, 278, 393

(56) References Cited

U.S. PATENT DOCUMENTS

| | | | | |
|---|---|---|---|---|
| 4,694,240 A | * | 9/1987 | Grunsch | 323/285 |
| 4,779,037 A | * | 10/1988 | LoCascio | 323/275 |
| 5,363,288 A | * | 11/1994 | Castell et al. | 363/59 |
| 5,465,011 A | * | 11/1995 | Miller et al. | 363/34 |
| 5,479,090 A | * | 12/1995 | Schultz | 323/284 |
| 5,490,055 A | * | 2/1996 | Boylan et al. | 363/41 |
| 5,568,041 A | * | 10/1996 | Hesterman | 323/207 |
| 5,684,686 A | * | 11/1997 | Reddy | 363/97 |
| 5,955,910 A | * | 9/1999 | Levin et al. | 327/393 |
| 6,147,517 A | | 11/2000 | AlNahas et al. | 327/65 |

OTHER PUBLICATIONS

Linear Technology. "LTC1530 High Power Synchronous Switching Regulator Controller," 1998, pp. 1–24. No Date.
National Semiconductor Corporation. "AN–1146 Designing a Multi–phase Asynchronous Buck Regulator Using the LM2639", Mar. 2000, pp. 1–5.

* cited by examiner

Primary Examiner—Rajnikant B. Patel
(74) Attorney, Agent, or Firm—Testa, Hurwitz & Thibeault, LLP

(57) ABSTRACT

This invention synchronizes the control signals generated by the out-of-range detection circuits with a predefined event. In one aspect, the invention relates to a method of controlling a switching regulator to regulate an output voltage. The method includes receiving a first enable signal and a second enable signal, comparing a feedback voltage representative of the output voltage to a first reference voltage and generating a first limit signal in response thereto and generating, in response to the first enable signal, a close switch command if the first limit signal indicates that the feedback voltage is less than the first reference voltage. The method further includes comparing the feedback voltage to a second reference voltage and generating a second limit signal in response thereto and generating, in response to the second enable signal, an open switch command if the second limit signal indicates that the feedback voltage is greater than the second reference voltage.

37 Claims, 17 Drawing Sheets

SYNCHRONIZED, RIPPLE INDEPENDENT WINDOW COMPARATOR FOR SWITCH-MODE POWER CONVERTERS

CROSS-REFERENCE TO RELATED APPLICATIONS

This application claims priority to U.S. provisional application Ser. No. 60/217,949, filed Jul. 13, 2000.

FIELD OF THE INVENTION

This invention relates generally to the field of regulated power sources and more specifically, to a method and apparatus for improving the response of switching regulators to load transients.

BACKGROUND OF THE INVENTION

FIG. 1 depicts, at a high level, a system 10 known to the prior art for controlling a switching regulator to regulate an output voltage. The system includes a PWM module 14, a first comparator 18, a second comparator 22, a first logic element 26 and a second logic element 30. The output of the second logic element 30 controls a switch 34 of a switching regulator. The PWM module 14 generates a pulse width modulated command signal to control the switch 34. Whenever the first comparator 18 detects that the output voltage 38 goes out of range (i.e., decreases below a first predetermined acceptable level), the first comparator 18, via logic element 30, rapidly overrides the control signal generated by the PWM module 14 and controls the switch 34 until the out of range condition ends. Similarly, whenever the second comparator 22 detects that the output voltage 38 goes out of range (i.e., increases above a second predetermined acceptable level), the second comparator 22, via logic elements 26 and 30, rapidly overrides the control signal generated by the PWM module 14 and controls the switch 34 until the out of range condition ends. This substantially immediate exit from the PWM control can lead to undesirable effects in the regulated output voltage.

SUMMARY OF THE INVENTION

It is an object of this invention to synchronize the action taken by the out-of-range detection circuits with one or more predefined events. In one aspect, the invention relates to a method of controlling a switching regulator to regulate an output voltage. The method includes receiving a first enable signal and a second enable signal, comparing a feedback voltage representative of the output voltage to a first reference voltage and generating a first limit signal in response thereto, and generating, in response to the first enable signal, a close switch command if the first limit signal indicates that the feedback voltage is less than the first reference voltage. The method further includes comparing the feedback voltage to a second reference voltage and generating a second limit signal in response thereto, and generating, in response to the second enable signal, an open switch command if the second limit signal indicates that the feedback voltage is greater than the second reference voltage.

In one embodiment, the method includes comparing the feedback voltage to a third reference voltage and generating a threshold signal in response thereto, and inhibiting the close switch command if the threshold signal indicates that the feedback voltage is greater than the third reference voltage. In another embodiment, the method includes generating a switch control signal. In another embodiment, the step of generating the switch control signal further includes receiving a clock signal, asserting a first state of the switch control signal in response to the clock signal, and comparing the feedback voltage to a fourth reference voltage and generating a difference signal in response thereto. The step of generating the switch control signal also includes comparing the difference signal and a timed ramp signal and asserting a second state of the switch control signal in response to the comparison of the difference signal and the timed ramp signal. In another embodiment, the method includes generating the first enable signal in response to the switch control signal. In another embodiment, the method includes generating the second enable signal in response to the clock signal.

In another embodiment, the method includes receiving a switch type signal having a first state and a second state. In another embodiment, the method includes converting the switch control signal into a drive signal compatible with a p-channel switching device in response to the first state of the switch type signal and converting the switch control signal into a drive signal compatible with a n-channel switching device in response to the second state of the switch type signal. In another embodiment, the method includes using the switch control signal to control a synchronous switching regulator. In another embodiment, the method includes generating the first enable signal in response to a logical combination of a plurality of regulator signals. In another embodiment, the method includes generating the second enable signal in response to a logical combination of the plurality of regulator signals.

In another aspect, the invention relates to a method of controlling a switching regulator to regulate an output voltage. The method includes receiving an enable signal, comparing a feedback voltage representative of the output voltage to a first reference voltage and generating a limit signal in response thereto, and generating, in response to the enable signal, a close switch command if the limit signal indicates that the feedback voltage is less than the first reference voltage. In one embodiment, the method includes comparing the feedback voltage to a second reference voltage and generating a threshold signal in response thereto, and inhibiting the close switch command if the threshold signal indicates that the feedback voltage is greater than the second reference voltage.

In another embodiment, the method includes generating a switch control signal. In another embodiment, the step of generating the switch control signal also includes receiving a clock signal, asserting a first state of the switch control signal in response to the clock signal, and comparing the feedback voltage to a third reference voltage and generating a difference signal in response thereto. The method further includes comparing the difference signal and a timed ramp signal and asserting a second state of the switch control signal in response to the comparison of the difference signal and the timed ramp signal. In another embodiment, the method includes generating the enable signal in response to the switch control signal.

In another embodiment, the method includes receiving a switch type signal having a first state and a second state. In another embodiment, the method includes converting the switch control signal into a drive signal compatible with a p-channel switching device in response to the first state of the switch type signal and converting the switch control signal into a drive signal compatible with a n-channel switching device in response to the second state of the switch type signal. In another embodiment, the method includes using the switch control signal to control a synchronous switching regulator. In another embodiment, the method includes generating the enable signal in response to a logical combination of a plurality of regulator signals.

In another aspect the invention relates to a method of controlling a switching regulator to regulate an output voltage. The method includes receiving an enable signal, comparing a feedback voltage representative of the output voltage to a first reference voltage and generating a limit signal in response thereto, and generating, in response to the enable signal, an open switch command if the limit signal indicates that the feedback voltage is greater than the first reference voltage. In one embodiment, the method includes generating a switch control signal. The step of generating the switch control signal includes receiving a clock signal, asserting a first state of the switch control signal in response to the clock signal, and comparing the feedback voltage to a second reference voltage and generating a difference signal in response thereto. The step of generating the switch control signal further includes comparing the difference signal and a timed ramp signal and asserting a second state of the switch control signal in response to the comparison of the difference signal and the timed ramp signal.

In another embodiment, the method includes generating the enable signal in response to the clock signal. In another embodiment, the method includes receiving a switch type signal having a first state and a second state. In another embodiment, the method includes converting the switch control signal into a drive signal compatible with a p-channel switching device in response to the first state of the switch type signal and converting the switch control signal into a drive signal compatible with a n-channel switching device in response to the second state of the switch type signal. In another embodiment, the method includes using the switch control signal to control a synchronous switching regulator. In another embodiment, the method includes comprising generating the enable signal in response to a logical combination of a plurality of regulator signals.

In another aspect, the invention relates to a system for controlling a switching regulator to regulate an output voltage. The system includes a main control module, a high limit module, a low limit module and an output logic module. The main control module includes a main control module output terminal, a main control module input terminal configured to receive a feedback voltage representative of the regulated output voltage and a main control module clock terminal configured to receive a master clock signal. The main control module further includes a main control module ramp input terminal configured to receive a timed ramp signal and a reference input terminal configured to receive a first reference signal representative of a regulation value of the feedback voltage. The high limit module includes an output terminal, a first input terminal in communication with the main control module input terminal, a reference input terminal configured to receive a second reference signal representative of a high limit and a timing input terminal in communication with the main control module clock terminal. The low limit module includes an output terminal, an input terminal in communication with the main control module input terminal, a first reference input terminal configured to receive a third reference signal representative of a low limit and a timing input terminal in communication with the main control module output terminal. The output logic module includes a first input terminal in communication with the main control module output terminal, a second input terminal in communication with the high limit module output terminal, a third input terminal in communication with the low limit module output terminal, and an output terminal for providing a switch command signal to control the switching regulator.

In one embodiment, the low limit module includes a first comparator and a flip-flop. The first comparator includes a first input terminal in communication with the first reference input terminal of the low limit module, a second input terminal in communication with the input terminal of the low limit module and an output terminal. The flip-flop includes an input terminal in communication with the output terminal of the first comparator, a timing input terminal in communication with the timing input terminal of the low limit module, a reset terminal and an output terminal in communication with the output terminal of the low limit module. In another embodiment, the low limit module includes a second reference input terminal configured to receive a fourth reference signal representative of a threshold limit. In another embodiment, the low limit module includes a second comparator. The second comparator includes a first input terminal in communication with the second reference input terminal of the low limit module, a second input terminal in communication with the input terminal of the low limit module and an output terminal in communication with the reset terminal of the flip-flop.

In another embodiment, the high limit module includes a comparator and a flip-flop. The comparator includes an output terminal, a first input terminal in communication with the reference input terminal of the high limit module and a second input terminal in communication with the first input terminal of the high limit module. The flip-flop includes an input terminal in communication with the output terminal of the comparator, a timing input terminal in communication with the timing input terminal of the high limit module and an output terminal in communication with the output terminal of the high limit module. In another embodiment, the output logic module includes an AND gate and an OR gate. The AND gate includes an output terminal, a first input terminal in communication with the first input terminal of the output logic module and an inverting input terminal in communication with the second input terminal of the output logic module. The OR gate includes a first input in communication with the third input terminal of the output logic module, a second input terminal in communication with the output terminal of the AND gate and an output terminal in communication with the output terminal of the output logic module.

In another embodiment, the main control module includes an amplifier, a compensation network, a comparator and a flip-flop. The amplifier includes an output terminal, a first input terminal in communication with the main control module input terminal and a second input terminal in communication with the reference input terminal of the main control module. The compensation network includes a first terminal in communication with the output terminal of the amplifier and a second terminal in communication with a voltage node. The comparator includes an output terminal, a first input terminal in communication with the output terminal of the amplifier and a second input terminal in communication with the main control module ramp input terminal. The flip-flop includes a set terminal in communication with the main control module clock terminal, a reset terminal in communication with the output terminal of the comparator and an output terminal in communication with the main control module output terminal. In another embodiment, the system includes a capacitive element electrically connected between the first and second terminals of the compensation network. In another embodiment, the system includes a filter in communication with the first input terminal of the high limit module. In another embodiment, the system includes a filter in communication with the first input terminal of the low limit module.

In another aspect, the invention relates to a system for controlling a switching regulator to regulate an output voltage. The system includes a means for receiving a first enable signal and a second enable signal, a means for comparing a feedback voltage representative of the output voltage to a first reference voltage and generating a first limit signal in response thereto, and a means for generating, in response to the first enable signal, a close switch command if the first limit signal indicates that the feedback voltage is less than the first reference voltage. The system further includes a means for comparing the feedback voltage to a second reference voltage and generating a second limit signal in response thereto, and a means for generating, in response to the second enable signal, an open switch command if the second limit signal indicates that the feedback voltage is greater than the second reference voltage. In one embodiment, the system includes a means for comparing the feedback voltage to a third reference voltage and generating a threshold signal in response thereto, and a means for inhibiting the close switch command if the threshold signal indicates that the feedback voltage is greater than the third reference voltage.

In another aspect, the invention relates to a system of controlling a switching regulator to regulate an output voltage. The system includes a means for receiving an enable signal, a means for comparing a feedback voltage representative of the output voltage to a first reference voltage and generating a limit signal in response thereto, and a means for generating, in response to the enable signal, a close switch command if the limit signal indicates that the feedback voltage is less than the first reference voltage. In one embodiment, the system includes a means for comparing the feedback voltage to a second reference voltage and generating a threshold signal in response thereto, and a means for inhibiting the close switch command if the threshold signal indicates that the feedback voltage is greater than the second reference voltage.

In another aspect, the invention relates to a system of controlling a switching regulator to regulate an output voltage. The system includes a means for receiving an enable signal, a means for comparing a feedback voltage representative of the output voltage to a reference voltage and generating a limit signal in response thereto, and a means for generating, in response to the enable signal, an open switch command if the limit signal indicates that the feedback voltage is greater than the reference voltage.

BRIEF DESCRIPTION OF THE DRAWINGS

Other objects, features and advantages will occur to those skilled in the art from the following description of a preferred embodiment and the accompanying drawings, in which.

DETAILED DESCRIPTION OF PREFERRED EMBODIMENTS

Figure 1:
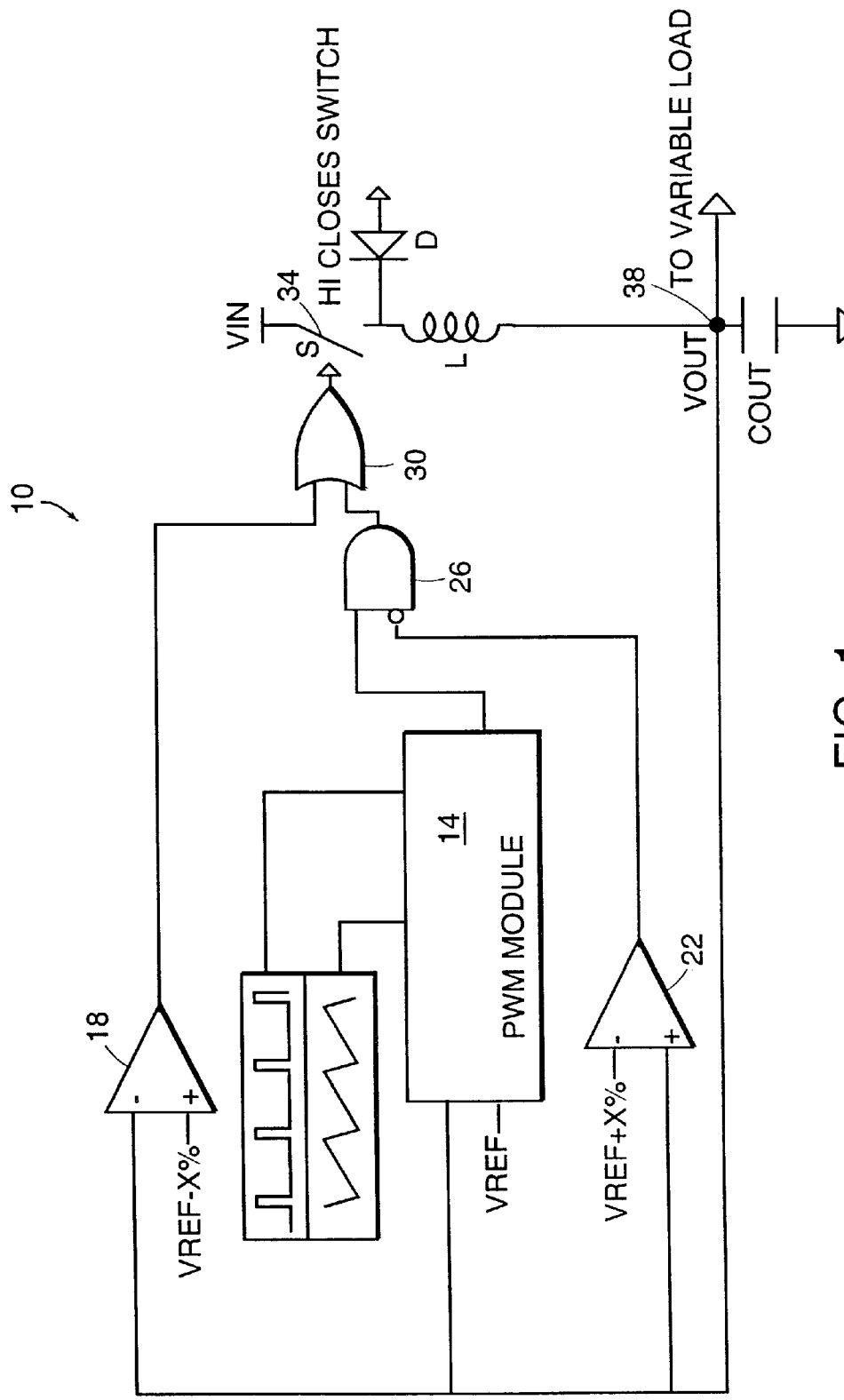
FIG. 1 is a high-level block diagram of an embodiment of a regulating circuit constructed in accordance with the prior art.
Figure 2:
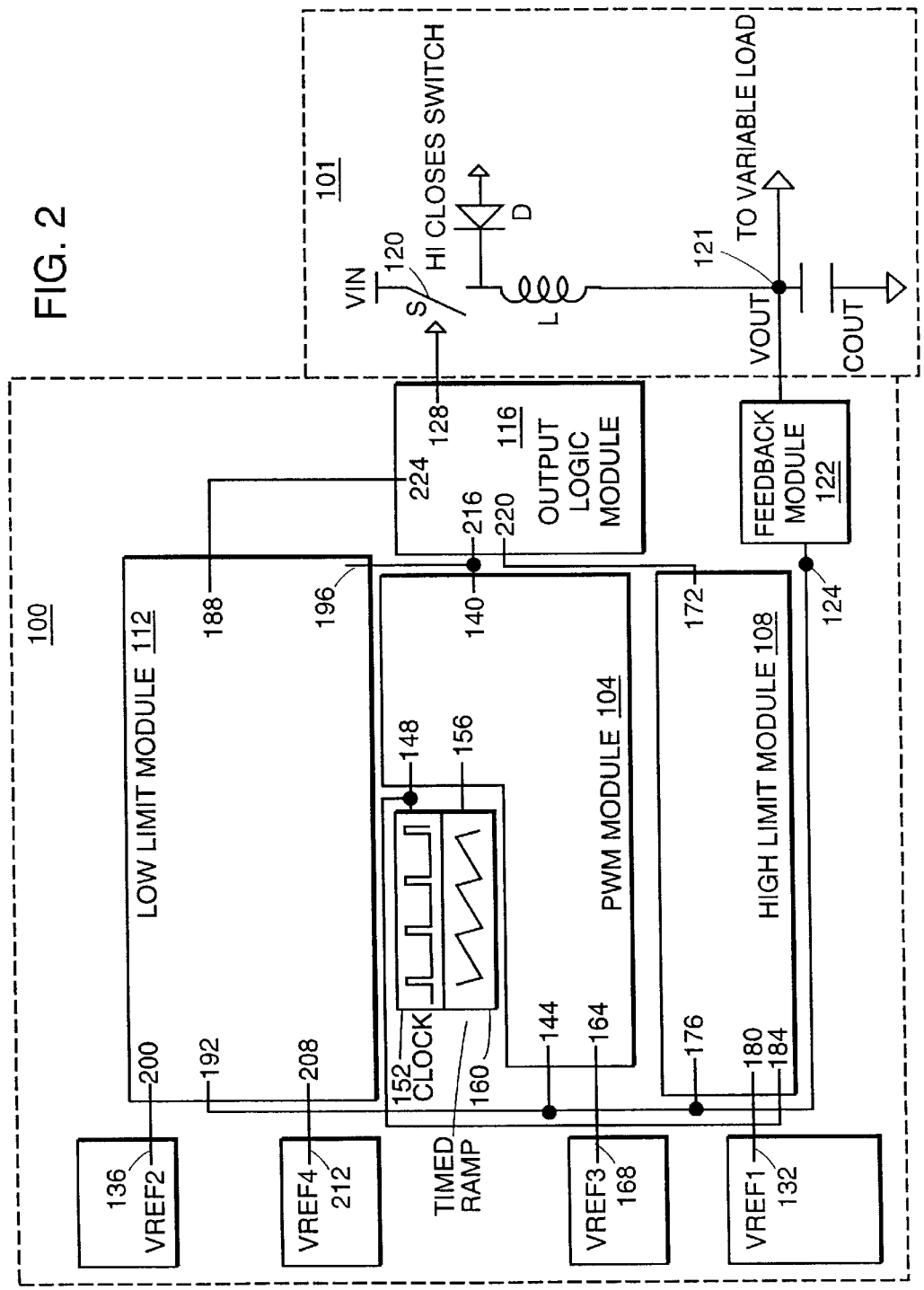
FIG. 2 is a high-level block diagram of one embodiment of a regulating circuit constructed in accordance with the invention.

FIG. 2 depicts, at a high level, an embodiment of a system 100 for controlling a switching regulator 101 to regulate an output voltage 121 constructed in accordance with the invention. The system 100 includes a PWM module 104, a high limit module 108, a low limit module 112 and an output logic module 116. The output terminal 128 of the output logic module 116 drives a switch 120 of a switching regulator 101 to regulate an output voltage 121 by using a feedback voltage 124, which is representative of the output voltage 121. In one embodiment, the system 100 also includes an optional feedback module 122. The feedback module 122 conditions the output voltage 121 as necessary, in accordance with the design requirements of the other modules 104, 108 and 112, as understood by one skilled in the art. For example, the feedback module 122 can include a buffer for load isolation, a resister divider for voltage shifting, and the like. In another embodiment, there are three feedback modules 122', 122'', 122''' (not shown), one corresponding to each module 104, 108 and 112, respectively, and designed for the needs of the particular corresponding module. In another embodiment, the feedback voltage 124 is the output voltage 121 directly.

The main control loop to regulate the output voltage 121 is performed by the PWM module 104. The high limit module 108 takes control of the switch 120 if the feedback voltage 124 exceeds a maximum voltage limit determined by Vref1 132. The low limit module 112 takes control of the switch 120 if the feedback voltage 124 falls below a minimum voltage limit determined by Vref2 136. In both cases, the control of the switch 120 by modules 108 and 112 is synchronized with the control of the switch 120 by the PWM module 104. The synchronization is performed by only allowing the modules 108 and 112 to control the switch 120 at certain predefined events, for example transitions from one state to another state of certain signals received by or generated from the PWM module 104. Preferably synchronization occurs just prior to a switch transition (e.g., switch opening or switch closing) so that the high limit module 108 and the low limit module 112 avoid noise from the switch transition. Switching noise can introduce errors in the determination of whether the feedback voltage 124 is within the limits. Synchronization just prior to a switch transition also prevents spurious switching of the switch 120.

The PWM module 104 includes a PWM output terminal 140; a PWM input terminal 144 electrically connected to the representative feedback voltage node 124; and a PWM clock terminal 148 configured to receive a master clock signal 152. The PWM module 104 also includes a PWM ramp input terminal 156 configured to receive a timed ramp signal 160 and a reference input terminal 164 configured to receive a reference voltage Vref3 168. Vref3 168 is a value corresponding to the desired value for the feedback voltage 124. Although this embodiment illustrates a PWM module 104 as the main control module for performing the main loop control for the switching regulator 101, other embodiments can employ different control loop algorithms. For example, the system 100 can regulate the output voltage 121 using current mode, ripple, hysteretic or multiphase algorithms, or an amalgam of these types of algorithms known in the art. In another embodiment, the system operates without any main control loop, and simply regulates about the limits determined by the high limit module 108 and the low limit module 112.

The high limit module 108 includes an output terminal 172; a first input terminal 176 electrically connected to the feedback voltage node 124; and a timing input terminal 184 configured to receive the master clock signal 152. The high limit module 108 also includes a reference input terminal 180 configured to receive the reference voltage Vref1 132. Vref1 132 is the value of the high (maximum) regulation limit for the feedback voltage 124.

The low limit module 112 includes an output terminal 188; an input terminal 192 electrically connected to the feedback voltage node 124; and a timing input terminal 196 electrically connected with the PWM output terminal 140. The low limit module 112 also includes a first reference input terminal 200 configured to receive the reference voltage Vref2 136. Vref2 136 is the value of a low (minimum) regulation limit for the feedback voltage 124.

In one embodiment, the low limit module 112 further comprises a second reference input terminal 208 configured to receive a reference voltage Vref4 212. Vref4 212 is the value of a threshold limit used to generate a control signal for inhibiting an output signal at the output terminal 188 of the low limit module 112.

The output logic module 116 includes a first input terminal 216 electrically connected with the PWM output terminal 140 and a second input terminal 220 electrically connected with the high limit module output terminal 172. The output logic module 116 also includes a third input terminal 224 electrically connected with the low limit module output terminal 188, and an output terminal 128. The output terminal 128 provides a switch command signal to control the switch 120 of the switching regulator 101.

Figure 3:
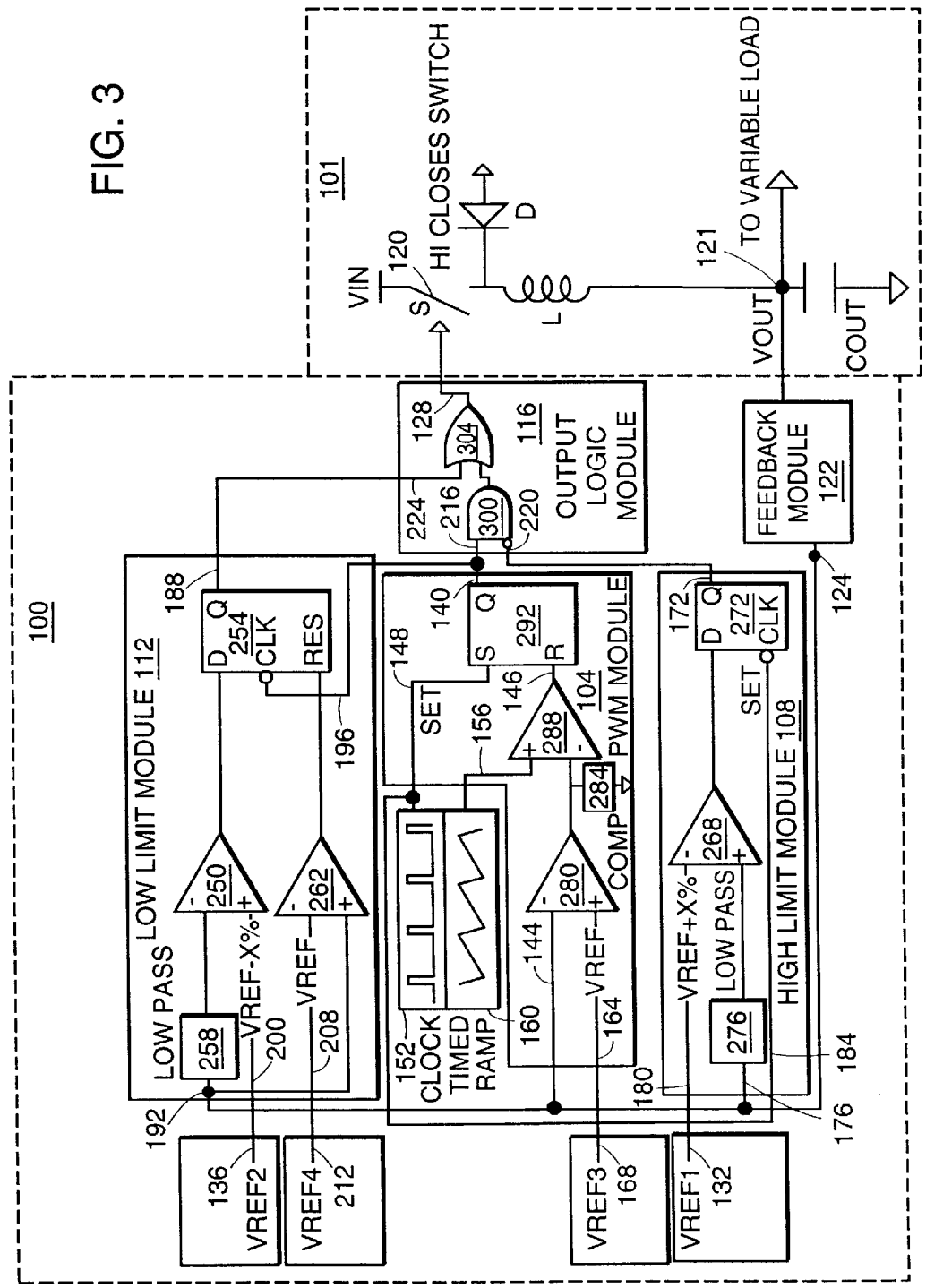
FIG. 3 is a more detailed block diagram of the embodiment of the circuit shown in FIG. 2.

FIG. 3 illustrates an exemplary embodiment of each of the modules 104, 108, 112, 116 of the system 100 in more detail. The low limit module 112 includes a first comparator 250 and a flip-flop 254. The first comparator 250 has a first input terminal (in this embodiment the positive terminal) which is the first reference input terminal 200 and a second input terminal (in this embodiment the negative terminal) connected to the input terminal 192 through a low pass filter 258. The output terminal of the first comparator 250 is connected to the D input of the flip-flop 254. The clock terminal (CLK) of the flip-flop 254 is connected to the timing input terminal 196, which is connected to the output terminal 140 of the PWM module 104. The Q output terminal of the flip-flop 254 is the output terminal 188 of the low limit module 112.

Table 1 summarizes the states internally generated by components of the low limit module 112. When the value of the feedback voltage 124 at the second terminal is greater than the value of the low limit Vref2 136 at the first terminal, the output terminal of the first comparator 250 generates a signal in a logic low state. The logic low state indicates that the feedback voltage 124 is in range (i.e., not below the value of the low limit 136). When the voltage at the second terminal is less than the voltage at the first terminal, the output of the first comparator 250 generates a signal in a logic high state. The logic high state indicates that the feedback voltage 124 is out of range (i.e., below the value of the low limit 136).

The flip-flop 254 latches the state of the output signal of the first comparator 250 on the falling edge of the control signal received at the timing input terminal 196, which is inverted at the clock terminal of the flip-flop 254. At this transition, the output state of the first comparator 250 becomes the latched output state at the Q output terminal of the flip-flop 254. The change of state of the output terminal Q of the flip-flop 254 is synchronized to the received transition of the control signal from the PWM module 104. The received control signal is the enable signal that corresponds to a predetermined event to which the corrective control signal (i.e., signal of the output terminal 188) of the low limit module 112 is synchronized.

In the embodiment shown in FIG. 3, the predetermined event that generates the enable signal is from a logic high to a logic low. In the switching regulator 101 shown, this transition occurs slightly before the feedback voltage 124 exhibits a voltage maximum and thus this is a time to which the low limit module should be synchronized. The delay of this transition propagating through the output logic module 116 and the driving circuitry to drive switch 120 is long enough for the flip-flop 254 to latch prior to switching noises propagating through the feedback voltage 124. This prevents the low limit module 112 from making an incorrect decision based on switching transients. In another embodiment, there is a delay module (not shown) in the output module 300 to ensure that the transition of the signal at the PWM output terminal 140 propagates to the flip-flop 254 faster than it propagates to the switch 120.

Latching the flip-flop 254 prior to the voltage maximum can reduce switching noise on the output voltage 121 by limiting spurious switching of switch 120. For example, if the output voltage 121 is below the low limit 136, the low limit module 112 commands the switch 120 to remain closed. Thus there is no opening of the switch 120 by the PWM module 104 quickly followed by a closing of the switch 120 by the low limit module 112. Instead, the synchronization enables the low limit module 112 to smoothly continue the current state of the switch 120. In other embodiments, the system 100 generates an enable signal, for example, in response to an external clock running at a predetermined duty cycle, to a dedicated internal clock, to a digital signal indicative of load or line changes or to a logical combination of two or more of these synchronizing signals or the like.

In the embodiment shown, the low limit module 112 also includes a second comparator 262. The second comparator 262 has a first input (in this embodiment the negative terminal) which is the second reference input terminal 208 and a second input terminal (in this embodiment the positive terminal) which is also the input terminal 192 of the low limit module 112. The output terminal of the second comparator 262 is connected to the reset terminal of the flip-flop 254.

When the voltage of the threshold limit Vref4 212 at the first terminal is greater than the value the feedback voltage 124 at second terminal, the second comparator 262 generates a signal in a logic low state. The logic low state indicates that the feedback voltage 124 has not passed through the threshold limit Vref4 212. When the voltage at the first terminal is less than the voltage at the second terminal, the second comparator 262 generates a signal in a logic high state. The logic high state indicates that the feedback voltage 124 has passed through the threshold limit. The logic high state resets the flip-flop 254, thereby inhibiting the output of the first comparator 250 from being clocked to the output (Q) of the flip-flop 254 and resetting the output state to a logic low.

TABLE 1

| First Comparator 250 Inputs | Generated D Input of Flip-flop 254 | Second Comparator 262 Inputs | Generated Reset Input of Flip-flop 254 | CLK Input of Flip-flop 254 | Generated Output Signal on at Terminal 188 of Low Limit Module 112 |
|---|---|---|---|---|---|
| Vout > Vref2 | Low | Vout < Vref4 | Low | Transition High to Low | Low |
| Vout < Vref2 | High | Vout < Vref4 | Low | Transition High to Low | High |
| Don't Care | Don't Care | Vout < Vref4 | Low | Transition Low to High | No Change |
| Don't Care | Don't Care | Vout < Vref4 | Low | No Transition | No Change |
| Don't Care | Don't Care | Vout > Vref4 | High | Don't Care | Low |

Similarly, the high limit module 108 includes a comparator 268 and a flip-flop 272. The comparator 268 has a first input terminal (in this embodiment the negative terminal) which is the reference input terminal 180 and a second input terminal (in this embodiment the positive terminal) connected to input terminal 176 through a low pass filter 276. The output terminal of the comparator 268 is connected to the D input terminal of the flip-flop 272. The clock terminal (CLK) of the flip-flop 272 is the timing input terminal 148. The output terminal of the flip-flop 272 is the output terminal 172 of the high limit module 108.

Table 2 summarizes the states internally generated by components of the high limit module 108. When the value of the high limit Vref1 132 on the first terminal is greater than the value of the feedback voltage 124 on the second terminal, the comparator 268 generates a signal in a logic low state. The logic low state from the output of the comparator 268 indicates that the feedback voltage 124 is in range (i.e., not above the value of the high limit 132). When the voltage at the first terminal is less than the voltage at the second terminal, the comparator 268 generates a signal in a logic high state. The logic high state from the output of the comparator 268 indicates that the feedback voltage 124 is out of range (i.e., above the value of the high limit 132).

The flip-flop 272 latches the state of the output signal of the comparator 268 at the falling edge of the clock pulse received from the timing input terminal 184, which is inverted at the clock terminal of the flip-flop 272. Upon the falling edge of the clock pulse, the output state of the comparator 268 becomes the latched state at terminal Q of the flip-flop 272. The change of state of the output at terminal Q of the flip-flop 272 is synchronized to the falling edge of the received clock pulse from the timing input terminal 184. The received clock pulse is the enable signal that corresponds to a predetermined event to which the control signal (i.e., signal of the output terminal 172) of the high limit module 108 is synchronized.

In the embodiment shown in FIG. 3, the predetermined event that generates the enable signal is the transition of the master clock signal 152 from a logic high to a logic low. This happens at a time interval, equal to the pulse width of the master clock signal 152, after the PWM module issues a close command (i.e., the output terminal 140 goes to a high state). In the switching regulator 101 shown, this transition occurs slightly before the feedback voltage 124 exhibits a voltage valley and thus this is a time during which to synchronize the output signal from the high limit module 108. The delay of this transition propagating through the output logic module 116 and the driving circuitry to drive switch 120 is long enough for the flip-flop 272 to latch prior to switching noises propagating through the feedback voltage 124. This prevents the high limit module 108 from making an incorrect decision based on switching transients. In another embodiment, there is a delay module (not shown) between the S input terminal of the flip-flop 292 and the PWM clock terminal 148 to ensure that the transition of the master clock signal 152 propagates to the flip-flop 272 faster than it propagates to the switch 120.

Latching the flip-flop 272 prior to the voltage maximum can reduce switching noise on the output voltage 121 by limiting spurious switching of the switch 120. For example, if the output voltage 121 is above the high limit 132, the high limit module 108 commands the switch 120 to remain opened. Thus there is no closing of the switch 120 by the PWM module 104 quickly followed by an opening of the switch 120 by the high limit module 108. Instead, the synchronization enables the high limit module 108 to smoothly continue the current state of the switch 120. In other embodiments, the system 100 generates an enable signal, for example, in response to an external clock running at a predetermined duty cycle, to a dedicated internal clock, to a digital signal indicative of load or line changes or to a logical combination of two or more of these synchronizing signals or the like.

TABLE 2

| Comparator 268 Inputs | Generated D Input of Flip-flop 272 | CLK Input of Flip-flop 272 | Generated Output Signal at Terminal 172 of High Limit Module 108 |
|---|---|---|---|
| Vout < Vref1 | Low | Transition High to Low | Low |
| Vout > Vref1 | High | Transition High to Low | High |
| Don't Care | Don't Care | Transition Low to High | No Change |
| Don't Care | Don't Care | No Transition | No Change |

The PWM 104 module includes an amplifier 280, a compensation network 284, a comparator 288 and a flip-flop 292 (e.g., set/reset flip-flop). The amplifier 280 has a first input terminal (in this embodiment the negative terminal) which is the PWM input terminal 144 and a second input terminal (in this embodiment the positive terminal) connected to the reference voltage Vref3 168. The output terminal of the amplifier 280 is electrically connected to a first terminal of the compensation network 284. A second terminal of the compensation network 284 is electrically connected to a voltage node. In the embodiment shown in FIG. 3, the voltage node is ground. In other embodiments, the voltage node can be, for example, a voltage rail or the PWM input terminal 144. In another embodiment, the compensation network is a capacitor with one terminal connected to the output terminal of the amplifier 280 and the other terminal connected to ground.

The comparator 288 has a first input terminal connected both to the output terminal of the amplifier 280 and the first terminal of the compensation network 284. The comparator 288 also includes a second input terminal, which is the PWM ramp input terminal 156. The output terminal of the comparator 288 is connected to the R input terminal 146 of the flip-flop 292. The S input terminal of the flip-flop 292 is the PWM clock terminal 148. The output terminal (Q) of the flip-flop 292 is the output terminal 140 of the PWM module 104.

In operation, the amplifier 280 generates a difference signal. The difference signal is proportional to the difference between the voltage value Vref3 168 at the second input terminal voltage minus the feedback voltage 124 at the first input terminal. The rate of change of the difference signal is reduced by the compensation network 284 connected to the output of the amplifier 280. In one embodiment, the compensation network is implemented such that the response time of the PWM module 104 to a change in the feedback voltage 124 is approximately an order of magnitude less than the response time of the low limit module 112 and/or the high limit module 108.

Table 3 summarizes the states internally generated by components of the PWM module 104. The first input terminal (in this embodiment the negative terminal) of comparator 288 receives the output signal (i.e., difference signal) of the amplifier 280. The second input terminal (in this embodiment the positive terminal) of comparator 288 receives the timed ramp signal 160. The timed ramp signal 160 represents a voltage to time translator necessary for PWM control. The embodiments of this translator vary according to the desired characteristics of the timed ramp signal 160 and the embodiments contain of all of the elements of voltage and current mode control. The characteristics of the timed ramp signal 160 vary with design goals, as is known in the art. When the voltage at the first input terminal is greater than the voltage at the second input terminal, the comparator 288 generates a signal in a logic low state. The logic low state from the output of the comparator 288 indicates that the duty cycle necessary to keep the voltage regulated under present load conditions has not been met and thus the switch 120 should remain in the closed position. When the voltage at the first input terminal is less than the voltage at the second input terminal, the comparator 288 generates a signal in a logic high state. The logic high state from the output of the comparator 288 indicates that the duty cycle necessary to keep the voltage regulated under present load conditions has now been met and thus the switch 120 should be open.

The flip-flop 292 latches the state of the command signal. In the embodiment shown, the flip-flop 292 is a set/reset type flip-flop. The set input terminal (S) of flip-flop 292 receives the master clock signal 152. When the master clock signal 152 transitions from a low state to high state, the flip-flop 292 generates a logic high signal, which corresponds to a close switch command. After the master clock signal 152 returns to a low state, the output of the comparator 288 changes from a high state to a low state provided that the voltage of the timed ramp signal drops below the voltage of the first input terminal. The reset input terminal (R) 146 of flip-flop 292 receives the output signal of the comparator 288. Consequently, when the output signal of the comparator 288 transitions from a low state to a high state, the flip-flop 292 output signal changes to a logic low signal, which represents an open switch command.

TABLE 3

| Comparator 288 Inputs | Generated R Input 146 of Flip-flop 292 | S Input 148 of Flip-flop 292 | Generated Signal on Output Terminal 140 of PWM Module 104 When S or R Transitions |
|---|---|---|---|
| V− > V+ | Low | Low | No Change |
| V− > V+ | Low | Transition to High | Change to High |
| V− < V+ | Transition to High | Low | Change to Low |
| V− < V+ | High | High | Change to Low (flip flop is Reset Dominant) |

The output logic module 116 includes an AND gate 300 and an OR gate 304. The AND gate 300 has a first input terminal which is the first input terminal 216 of the output logic module 116 and an inverting terminal which is the second input terminal 220 of the output logic module 116. The OR gate 304 has a first input terminal which is the third input terminal 224 of the output logic module 116 and a second input terminal which is in communication with the output terminal of the AND gate 300. The output terminal of the OR gate 304 is the output terminal 128 of the output logic module 116.

Table 4 summarizes the states internally generated by components of the output logic module 116. The inverting terminal of the AND gate 300 receives the command signal from the output terminal 172 of the high limit module 108. When the inverting terminal is in the logic low state, this indicates that the feedback voltage 124 is not above the high limit. The AND gate 300 generates an output signal in the same state as the signal present at its first input terminal (i.e., the output signal of the PWM module 104).

When the output signal of the AND gate 300 is in a high state, the output signal of the OR gate 304 is in a high state, regardless of the state of the signal at third input terminal 224 of the output logic module 116. Consequently, the state of the switch 120 is closed when the output signal of the OR gate 304 is high. When the output signal of the AND gate 300 is low, the output signal of the OR gate 304 is the state of the signal at the third input terminal 224 of the output logic module 116. If the state of the signal at the third input terminal 224 of the output logic module 116 is low, indicating that the feedback voltage 124 is not below the low limit, the output signal generated by the OR gate is low. As a result, switch 120 is open when the output signal of the OR gate 304 is in the low state. If the state of the signal at the third input terminal 224 of the output logic module 116 is high, indicating that the feedback voltage 124 is below the low limit, the output signal generated by the OR gate 304 is high. Consequently, the output signal of the OR gate 304 in a high state causes the switch 120 to be closed, so as to correct the out-of-range condition and ignore information coming from the main control module PWM module 104.

When the signal at the inverting terminal of the AND gate 300 is in the logic high state, indicating that the feedback voltage 124 is above the high limit, the AND gate 300 generates a logic low regardless of the state of the signal at the second input terminal 216 of the output logic module 116. When the output signal of the AND gate 300 is in a low state, as described above, the output signal generated by the OR gate 304 is governed by the state of the signal at the third input terminal 224 of the output logic module 116. However, when the feedback voltage 124 is over the high limit, the third input terminal 224 of the output logic module 116 will be low due to the initiation of a reset on flip flop 254 by comparator 262. The output signal of the OR gate 304 being in a low state causes the switch 120 to open, so as to correct the out-of-range condition.

TABLE 4

| Inverting Input Terminal of AND Gate 300 | First Input Terminal of AND Gate 300 | Generated Output of AND Gate 300 | First Input Terminal of OR Gate 304 | Generated Output of OR Gate 304 |
|---|---|---|---|---|
| Low | Low | Low | Low | Low |
| Low | Low | Low | High | High |
| Low | High | High | Don't Care | High |
| High | Don't Care | Low | Low | Low |

Figure 4:
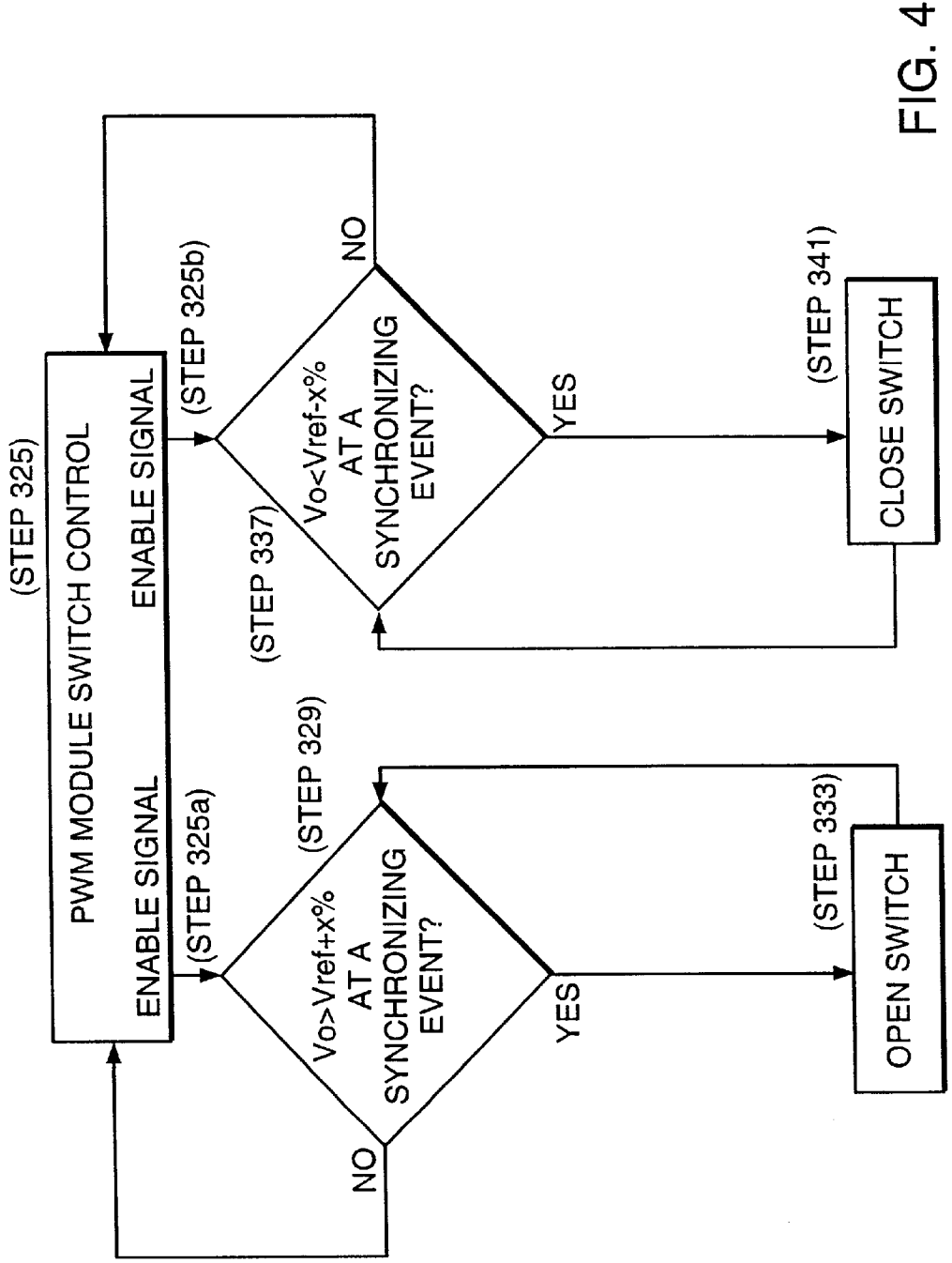
FIG. 4 is a flow diagram of one embodiment in accordance with the invention.

FIG. 4 illustrates a flow diagram of one embodiment of the regulating process in accordance with the invention. The PWM module 104 controls (step 325) the opening and closing of the switch 120. In this embodiment an enable signal is generated (i.e., synchronizing event) either by a transition to a close switch command (step 325a) or a transition to an open switch command (step 325b). As described above, the command by the PWM module 104 happens before the switch 120 actually transitions between states, thus allowing the high and low limit modules 108, 112 to make a decision before there is switching noise on the feedback voltage 124. If a close command is issued (step 325a), the high limit module 108, at the synchronizing event (e.g., a predetermined time prior to the transition of the switch 120 to a close state), determines (step 329) whether the feedback voltage 124 is above the high limit Vref1 132 (e.g., Vref+x %, where Vref is the desired output voltage value and x is the allowable tolerance). If the feedback voltage 124 is not above the high limit Vref1 132, the PWM module 104 continues to issue open and close commands (step 325) to control the switching regulator 101. If the high limit module 108 determines (step 329) the feedback voltage 124 is above the high limit Vref1 132, the high limit module 108 issues (step 333) an open switch command that maintains the switch 120 in an opened state. At each subsequent synchronization event, the high limit module 108 determines (step 329) if the feedback voltage 124 is still above the high limit Vref1 132. Once the feedback voltage 124 is below the high limit Vref1 132, the next synchronization event transfers switch control back to the PWM module 104.

Similarly, if an open command is issued (step 325b), the low limit module 112, at the synchronizing event (e.g., a predetermined time prior to the transition of the switch 120 to an open state), determines (step 337) whether the feedback voltage 124 is below the low limit Vref2 136 (e.g., Vref−x %, where Vref is the desired output voltage value and x is the allowable tolerance). If the result is "NO", the PWM module 104 continues to issue open and close commands (step 325) to control the switching regulator 101. If the low limit module 112 determines (step 337) the feedback voltage 124 is below the low limit Vref2 136, the low limit module 112 issues (step 341) a close switch command that maintains the switch 120 in a closed state. At each subsequent synchronization event, the low limit module 112 determines (step 337) if the feedback voltage 124 is still below the low limit Vref2 136. Once the feedback voltage 124 is above the low limit Vref2 136, the next synchronization event transfers switch control back to the PWM module 104.

Figure 5:
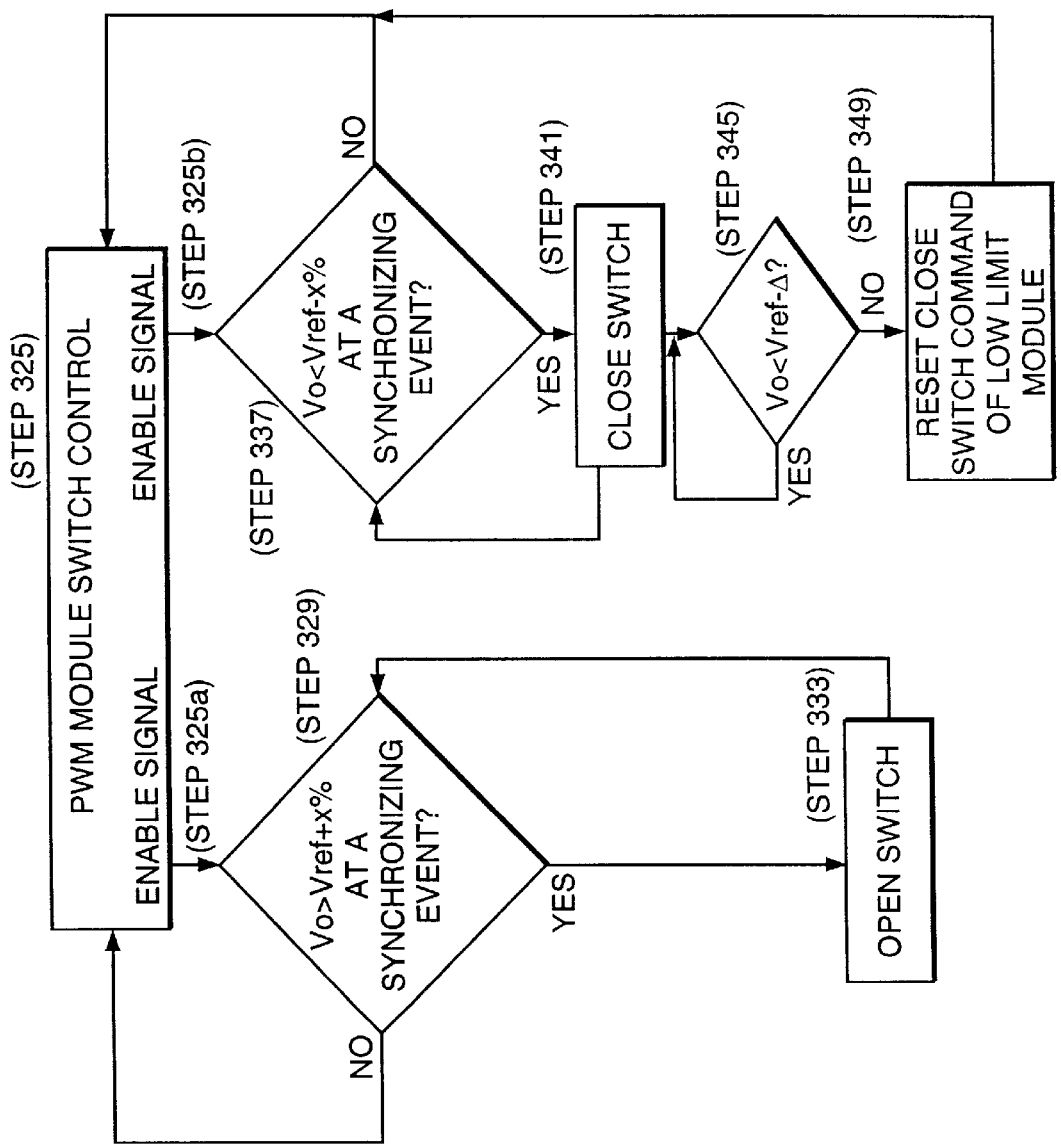
FIG. 5 is a flow diagram of another embodiment of a method of controlling a switching regulator performed in accordance with the invention.

FIG. 5 illustrates a flow diagram of another embodiment of the regulating process in accordance with the invention. This embodiment adds additional steps to the embodiment depicted in FIG. 4. In this embodiment, the response time of the PWM module 104 for reacting to a transient event in the feedback voltage 124 is at least an order of magnitude slower in than the response times of the high limit module 108 and the low limit module 112. Because of the slower reaction time, the PWM module 108 might not have sufficient time to react to a sudden decrease in feedback voltage 124 and the subsequent close switch command issued (step 341) by the low limit module 112. Consequently, the faster reaction time by the low limit module 112 can cause the value of the feedback voltage 124 to rise above the high limit reference voltage Vref1 132 before the next clock pulse to the flip-flop 254 would remove the close switch command. To prevent this "overshoot", step 345 and step 349 are added to the process.

After the low limit module 112 issues (step 341) a close switch command, it continues in two parallel paths. In one path, the low limit module proceeds to step 337 and at each synchronizing event, determines (step 337) whether the feedback voltage 124 is below the low limit Vref2 136. In the second parallel path, the low limit module 112 also determines (step 345), without regard to the synchronizing events, whether the feedback voltage 124 has increased past a threshold voltage Vref4 212 (e.g., Vref-Δ). If the feedback voltage 124 has not reached the threshold voltage, the low limit module 112 continues to determine (step 345) whether the feedback voltage 124 has increased past the threshold voltage Vref4 212. When the feedback voltage 124 passes the threshold voltage Vref4 212, the low limit module 112 resets (step 349) the close switch command from the low limit module 112. As a result, the PWM module 104 has an opportunity to regain control (step 325) of the regulation process without the feedback voltage 124 overshooting the high limit reference voltage Vref1 132.

Figure 6:
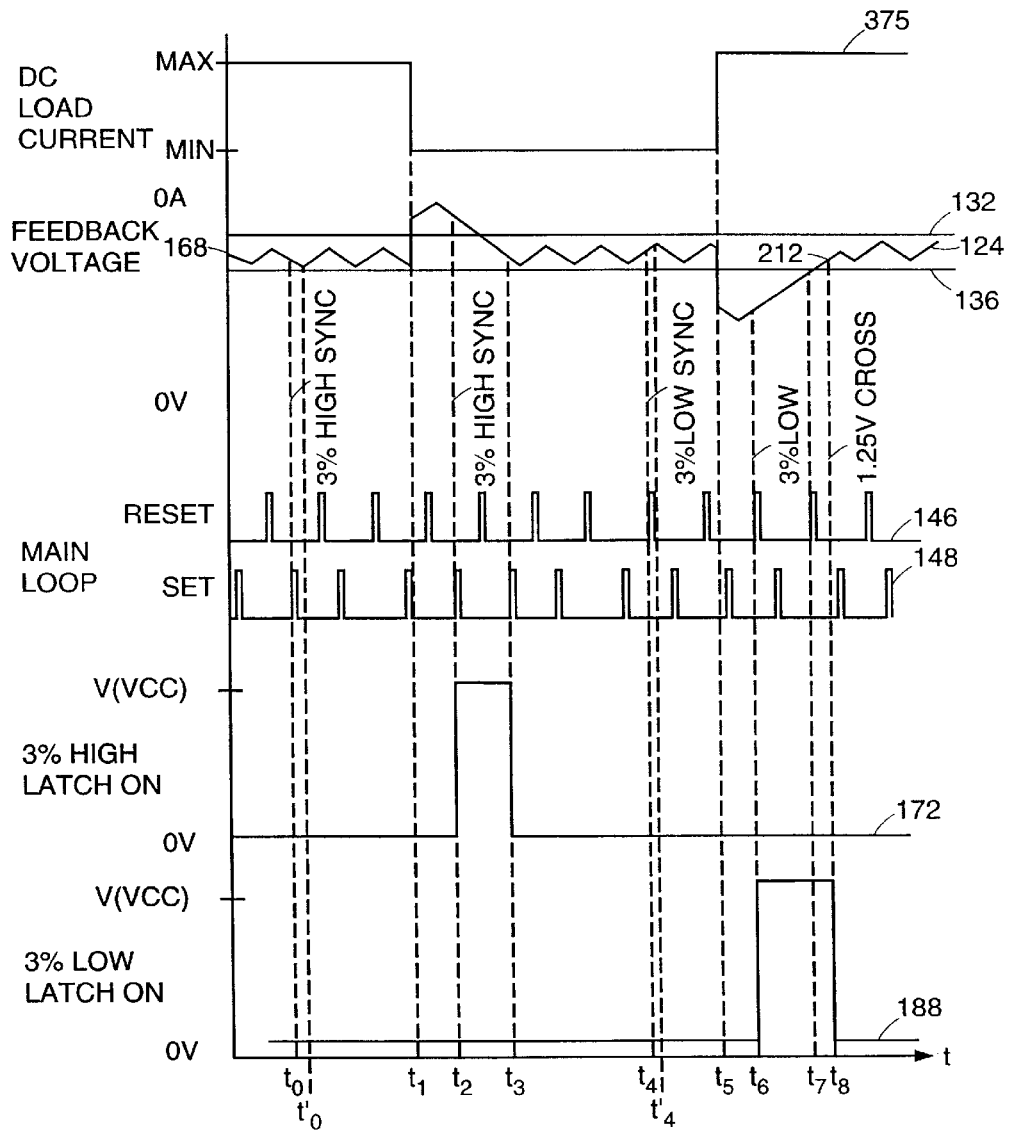
FIG. 6 is a timing diagram of electrical signals of one embodiment in accordance with the invention.

FIG. 6 depicts an exemplary timing diagram graphing various voltage and current signals related to the system 100. The horizontal axis represents time and the vertical axis represents relative current or voltage for each of the signals 375, 124, 146, 148, 172, 188. DC Load Current 375 and Feedback Voltage 124 represent the load current through and the voltage across a load coupled to the output voltage 121 node and ground. The relative values of the high voltage limit Vref1 132, the low voltage limit Vref2 136, the regulation value Vref3 168 and the threshold value Vref4 212 are also shown.

Main Loop represents the input signals applied to the reset input (R) 146 and the set input (S) 148 of the flip-flop 292 of the PWM module 104 (see FIG. 3). For ease of illustration, any propagation delay of the signal applied at the reset input (R) 146 through flip-flop 292 is ignored. Thus the transition of the signal at the reset input (R) 146 is equivalent, for timing illustration, to a transition at the output 140 of the flip-flop 292 used as a synchronizing event in the embodiment depicted in FIG. 3. 3% High Latch On represents the command signal at the output terminal 172 of the high limit module 108. The logic high pulse represents an out-of-range condition in which the feedback voltage 124 exceeds the high limit reference voltage Vref1 132 and the resulting command is to open the switch 120. 3% Low Latch On represents the command signal at the output terminal 188 of the low limit module 112. The logic high pulse represents an out-of-range condition in which the feedback voltage 124 is less than the low limit reference voltage Vref2 136 and the resulting command is to close the switch 120.

In the embodiment depicted, the synchronizing enable signal occurs when the Set pulse 148 transitions from a logic low to logic high (e.g., see the feedback voltage 124 at $t_0$). This transition occurs slightly before the switch 120 closes, corresponding to a voltage trough (e.g., see the feedback voltage 124 at $t_0'$). As described above, the propagation delay is due to additional circuitry through which the Set pulse 148 propagates. Because the Set pulse 148 corresponds to a time before a voltage trough, the Set pulse 148 is used as the synchronizing event to direct the high limit module 108 to issue a corrective open switch command if required (e.g., logic high on the high limit output 172 at $t_2$ to $t_3$) without being affected by switching noise.

Similarly, in the embodiment depicted, another synchronizing enable signal occurs when the Reset pulse 148 transitions from a logic low to logic high (e.g., see the feedback voltage 124 at $t_4$). Shortly after the Reset pulse 146 transitions from a logic low to a logic high, the switch 120 opens, terminating the on-time cycle and therefore corresponding to a voltage peak (e.g., see the feedback voltage 124 at $t_4'$). Because the Reset pulse 146 corresponds to a time before a voltage peak (e.g., see the feedback voltage 124 at $t_4$), the Reset pulse 146 is used as the synchronizing event to direct the low limit module 112 to issue a corrective close switch command if required (e.g., logic high on the low limit output 188 at $t_6$ to $t_8$) without being affected by switching noise.

The DC Load Current 375 depicts two step changes in the load current. The first step change occurs at $t_1$ when the load current 375 transitions from a maximum current to a minimum current. This step change causes a rapid increase in the feedback voltage 124 so that the value of the feedback voltage 124 exceeds the high limit Vref1 132. In response, the signal generated by the comparator 268 of the high limit module 108 changes to indicate the out-of range condition. However, the flip-flop 272 of the high limit module 108 does not change the state of the signal at the output terminal 172 until the next synchronizing event (i.e., the next set signal 148 at $t_2$). At $t_2$, the flip-flop 272 changes state by latching the signal at the output terminal Q 172 to a logic high. From $t_2$ to $t_3$, the feedback voltage 124 decreases to a value less than the high limit Vref1 132 and the output signal of comparator 268 of the high limit module 108 changes to indicate an in range condition. However, the flip-flop 272 does not change the state of the signal at the output terminal 172 until the next synchronizing event (i.e., the next set signal 148 at $t_3$). At $t_3$, the flip-flop 272 changes state by latching at the output terminal Q 172 to a logic low.

The second step change of the DC Load Current occurs at $t_5$ when the load current 375 transitions from a minimum current to a current maximum. The step change causes a rapid decrease in the feedback voltage 124 so that the value of the feedback voltage 124 falls below the low limit Vref2 136. In response, the signal generated by the first comparator 250 of the low limit module 112 changes to indicate the out-of-range condition. However, the flip-flop 254 of the low limit module 112 does not change the state of the signal at the output terminal 188 of the low limit module 112 until the next synchronizing event (i.e., the next reset signal 148 at $t_6$). At $t_6$, the flip-flop 254 changes state by latching the state of the signal at the output terminal 188 of the low limit module 112 to a logic high. At the next synchronizing event (i.e., the next reset signal 148 at $t_7$), the feedback voltage 124 has not yet risen above the low limit 136. The output signal at the first comparator 250 remains at a logic high state and the output of the flip-flop 254 remains in the high state. From $t_7$ to $t_8$, the feedback voltage 124 increases to a value greater than the low limit Vref2 136. Time $t_8$ represents the time when the feedback voltage 124 reaches the threshold value Vref4 212. At time $t_8$, the output signal of the second comparator 262 of the low limit module 112 changes to indicate that the feedback voltage 124 has reached the threshold reference voltage Vref4 212. Upon this change, the flip-flop 254 is reset. The resetting of the flip-flop 254 changes the state of the signal at the output terminal 188 of the low limit module 112 to a logic low.

Figures 7, 7A:
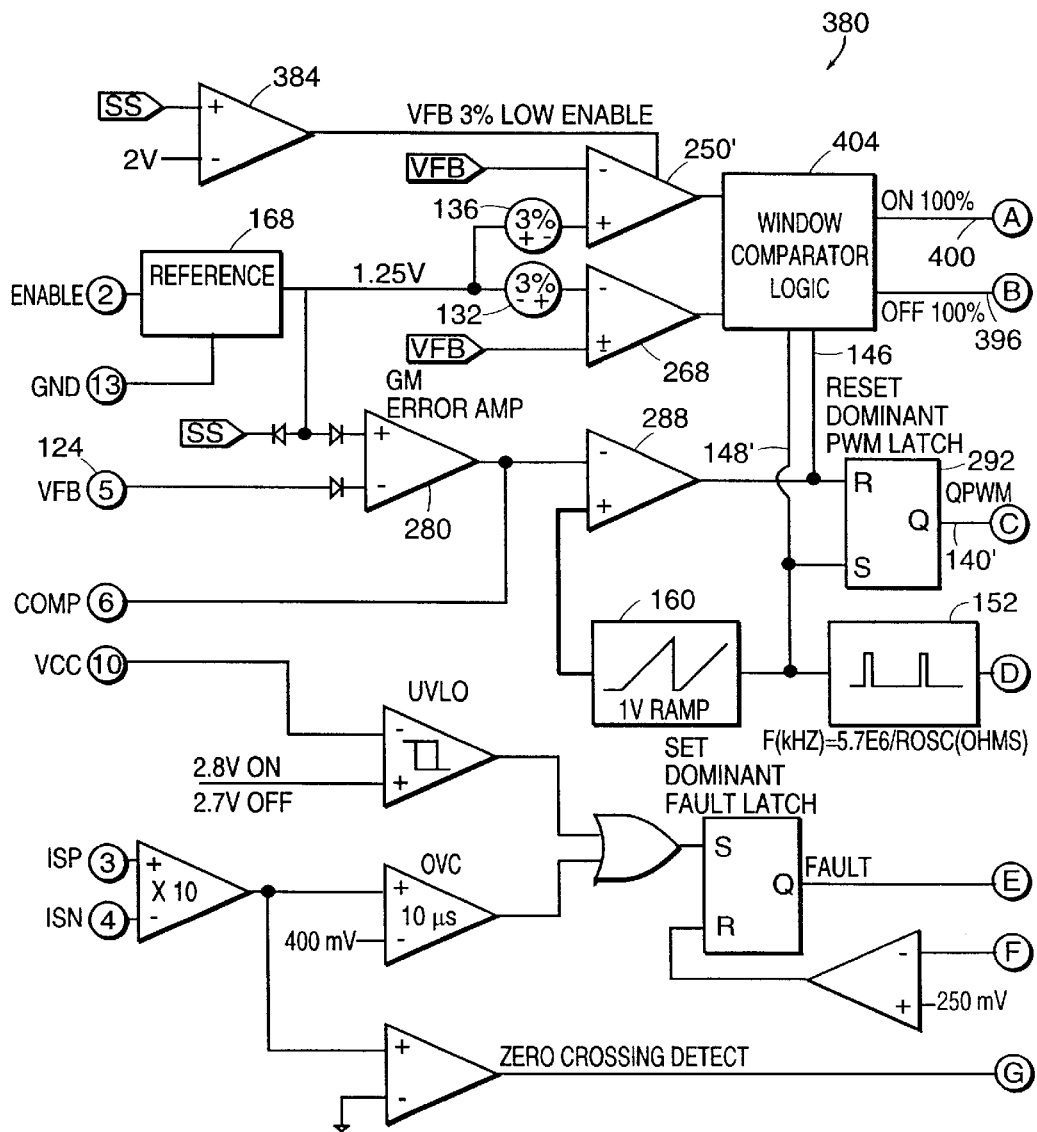
FIG. 7 is a detailed block diagram of an embodiment of an integrated circuit to control a switching regulator in accordance with the invention.
Figure 7B:
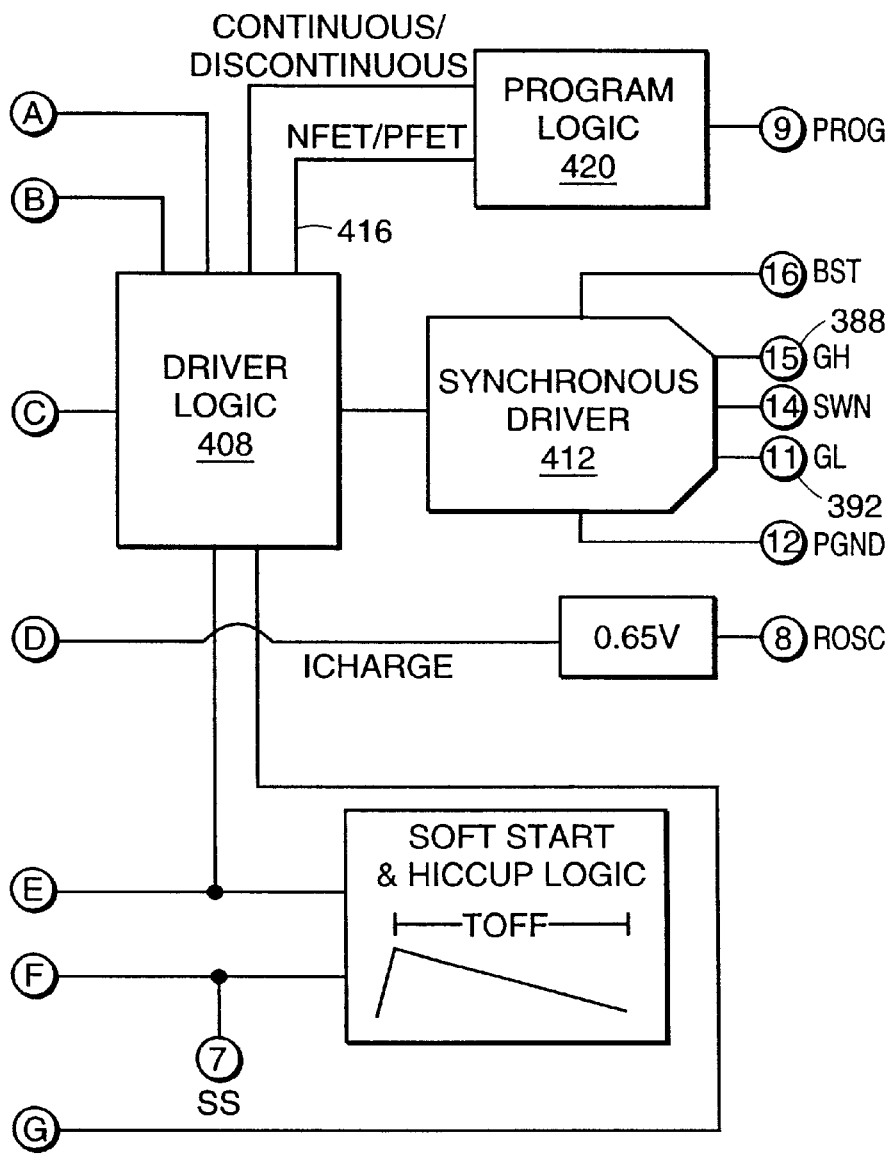

FIG. 7 depicts an integrated circuit 380 to control a synchronous switching regulator. The integrated circuit 380 issues commands to control a high side switch (e.g., p-channel FET or n-channel FET) connected to a high side gate driver output pin 388. The integrated circuit 380 also issues commands to control a low side switch (e.g., n-channel FET) connected to a low side gate driver output pin 392. In this embodiment, the first comparator 250', used to determine whether the feedback voltage 124 is less than the low limit reference voltage Vref2 136, includes an enable input connected to the output of a soft start comparator 384. This prevents an out-of-range indication at start up of the circuit. The latching of the out-of-range command signals to open the switch 396 and to close the switch 400 is performed in a window comparator logic module 404.

The window comparator logic module 404 receives, as synchronizing signals, the input signals to terminals S 148' and R 146 of the PWM flip-flop 292. In one embodiment, the window comparator logic module 404 issues an open switch command on terminal 396 and a close switch command on terminal 400 synchronized with a low to high transition of these input signals. In another embodiment, a time delay is added to the low to high transition of the input signals to ensure that a PWM command propagates to the high side gate driver output pin 388 and the low side gate driver output pin 392 after corrective action is initiated by the window comparator logic module 404.

The driver logic module 408 includes logic components to create a synchronous switch command that the logic module 408 transmits to the synchronous driver module 412. The synchronous driver module 412 ensures that the high side switch connected to the high side gate driver output pin 388 and the low side switch connected to the low side gate driver output pin 392 work such that conduction cycles are out of phase with each other. The driver logic module 408 receives the PWM command from the output terminal 140' of the PWM flip-flop 292 and the out-of-range command signals from terminals 396 and 400 of the window comparator logic module 404. Based on these received signals, the driver logic module 408 determines whether the high side switch connected to the high side gate driver output pin 388 should be commanded open or closed.

The driver logic module 408 also receives a NFET/PFET signal 416 from the program logic module 420. The NFET/PFET signal 416 indicates whether the high side switch connected to the high side gate driver output pin 388 is a p-channel device or an n-channel device. Using the NFET/PFET signal 416, the driver logic module 408 ensures that the open or close switch command has the appropriate magnitude and polarity for the high-side switching device (i.e., PFET or NFET) connected to the high side gate driver output pin 388. For example, for a p-channel device, the close switch command (e.g., logic high) is converted to substantially zero voltage to render the switching device conductive. The open switch command (e.g., logic low) is converted to a positive voltage sufficient to render the switching device non-conductive. Conversely, for an n-channel device, the close switch command (e.g., logic high) is converted to a positive voltage sufficient to render the switching device conductive. The open switch command (e.g., logic low) is converted to a substantially zero voltage to render the switching device non-conductive.

Figure 8:
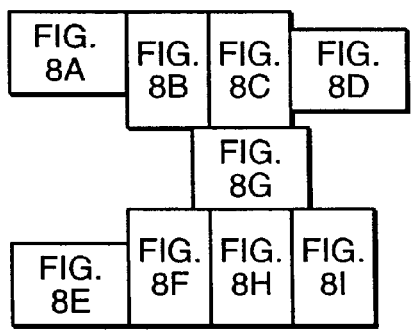
FIG. 8 is a detailed block diagram of another embodiment of an integrated circuit to control a switching regulator in accordance with the invention.
Figure 8A:
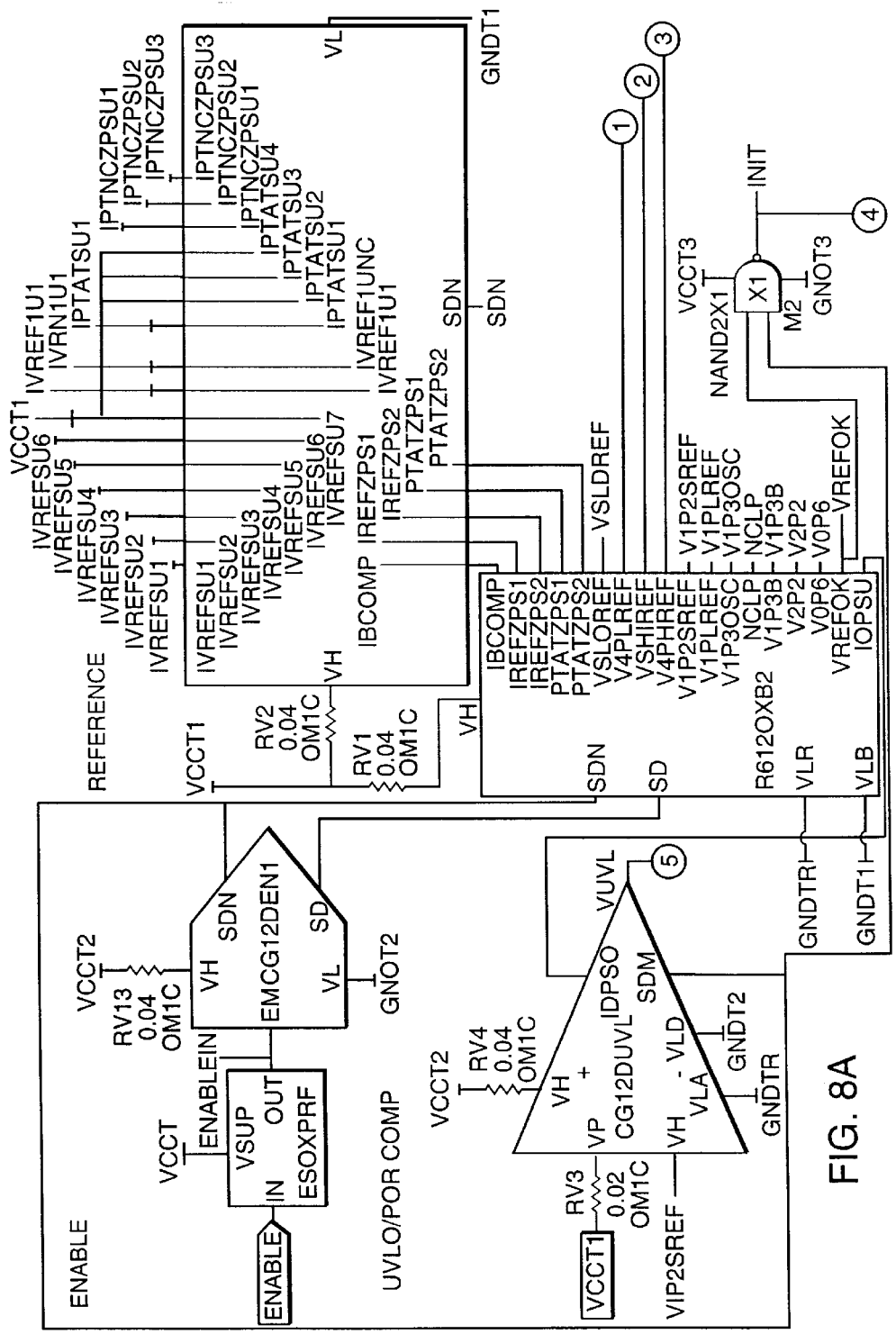
Figure 8B:
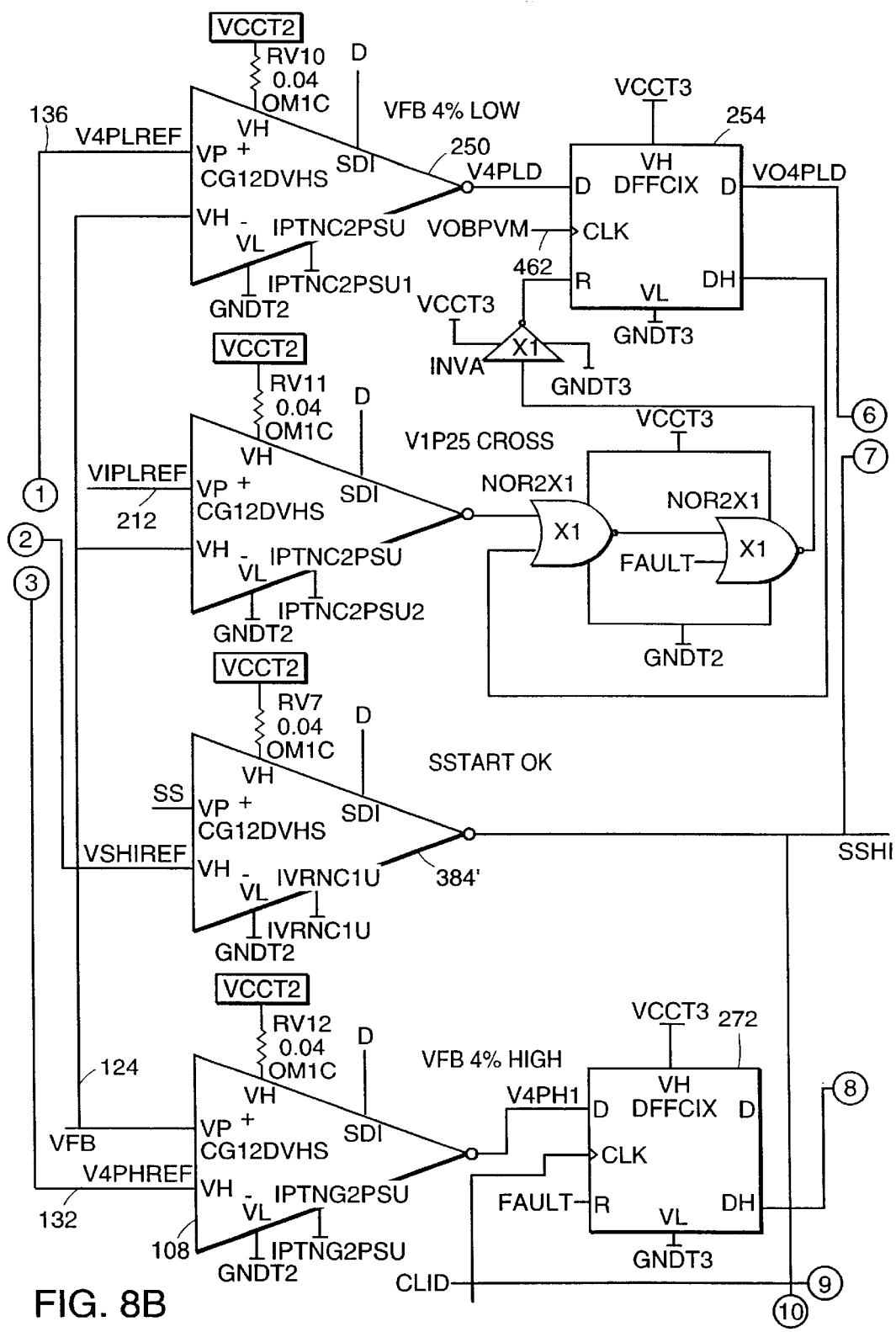
Figure 8C:
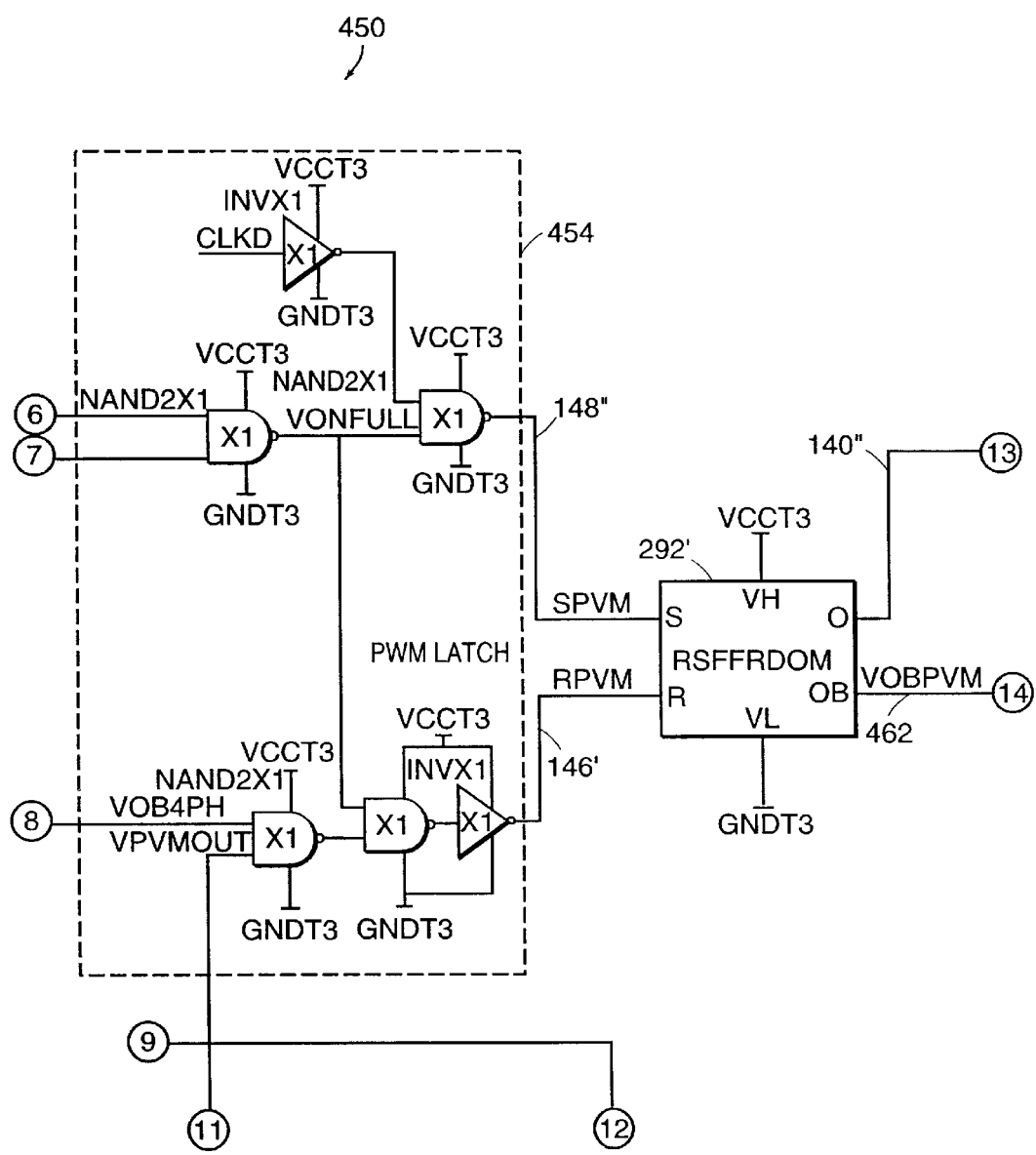
Figure 8D:
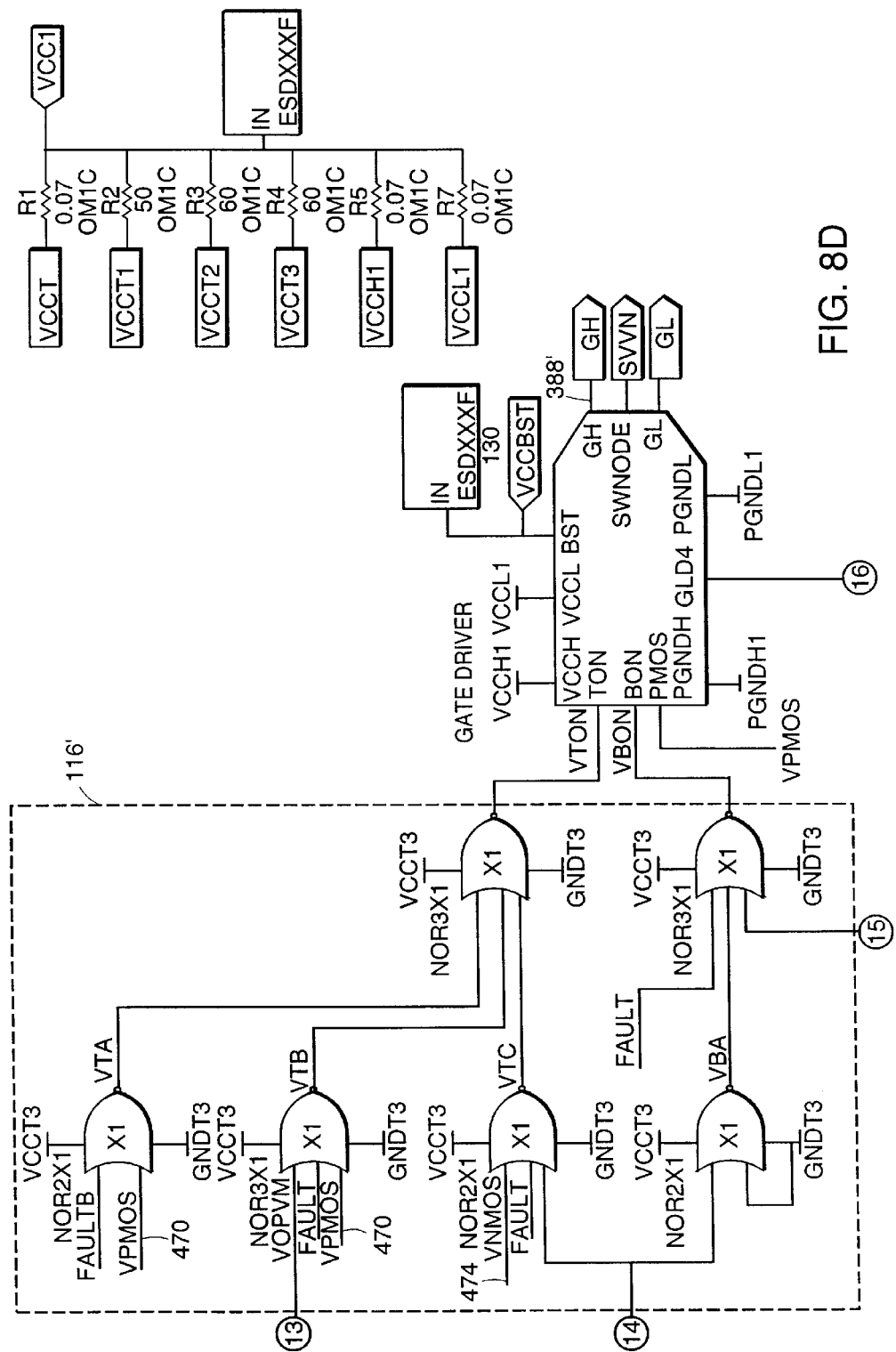
Figure 8E:
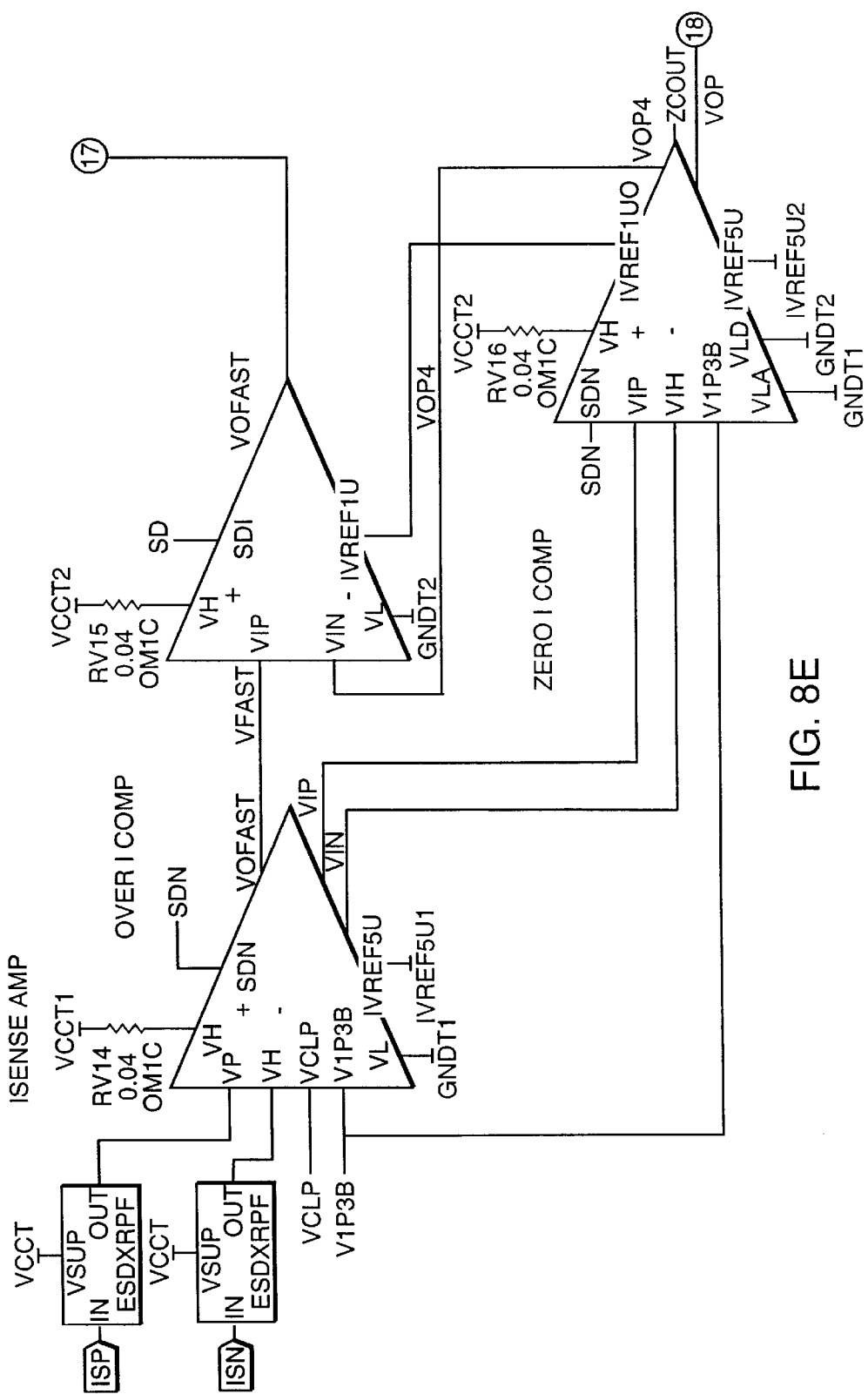
Figure 8F:
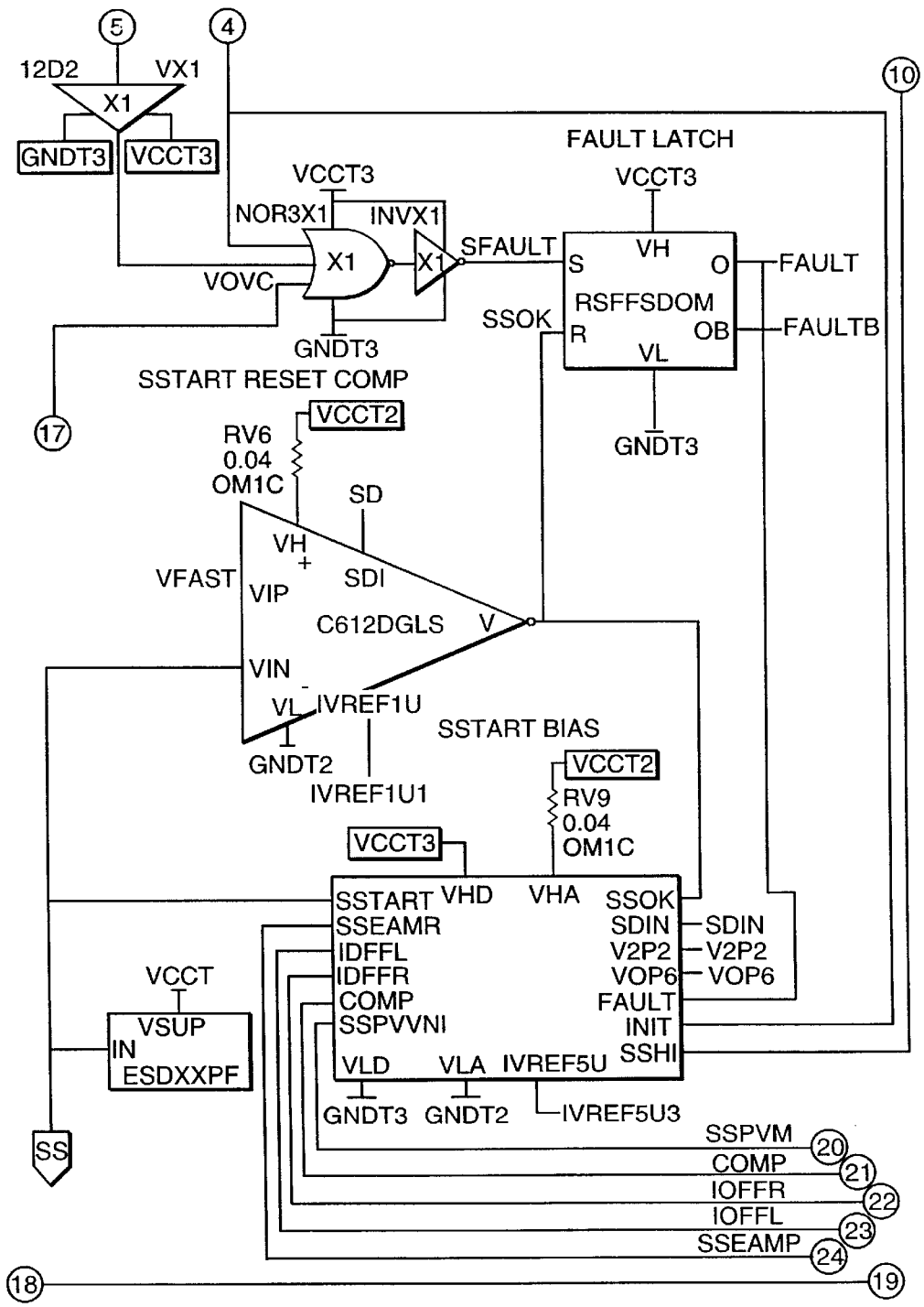
Figure 8G:
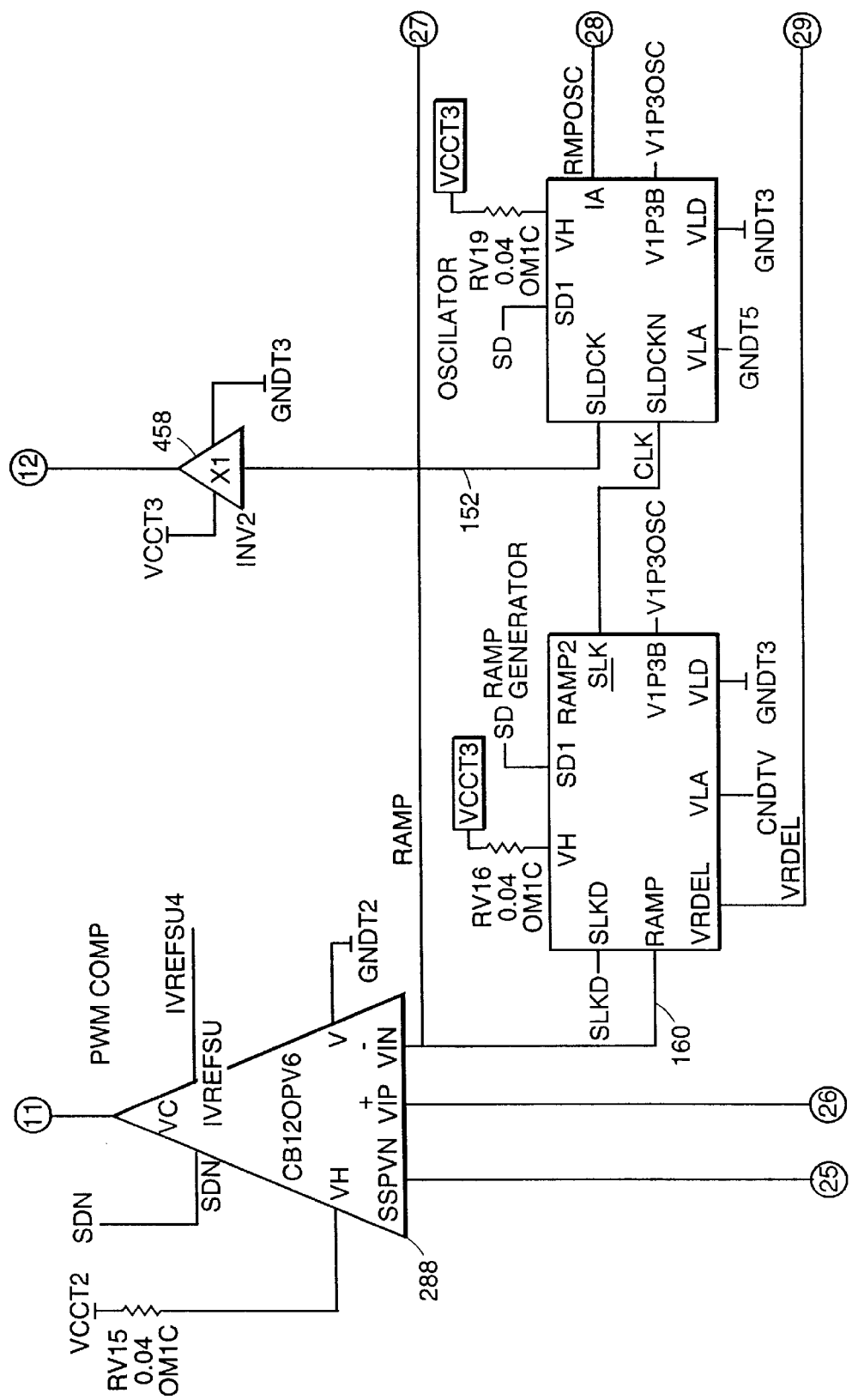
Figure 8H:
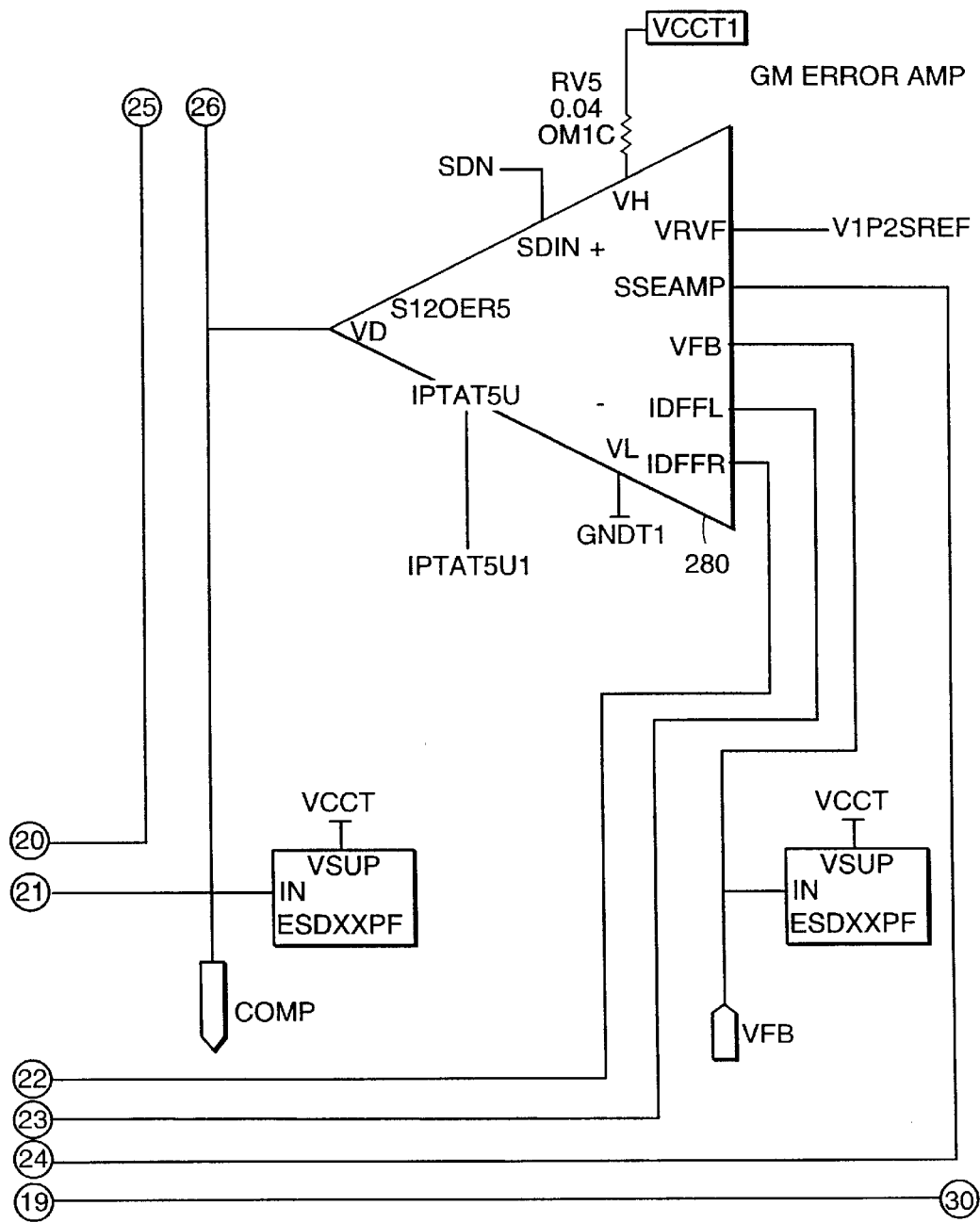
Figure 8I:
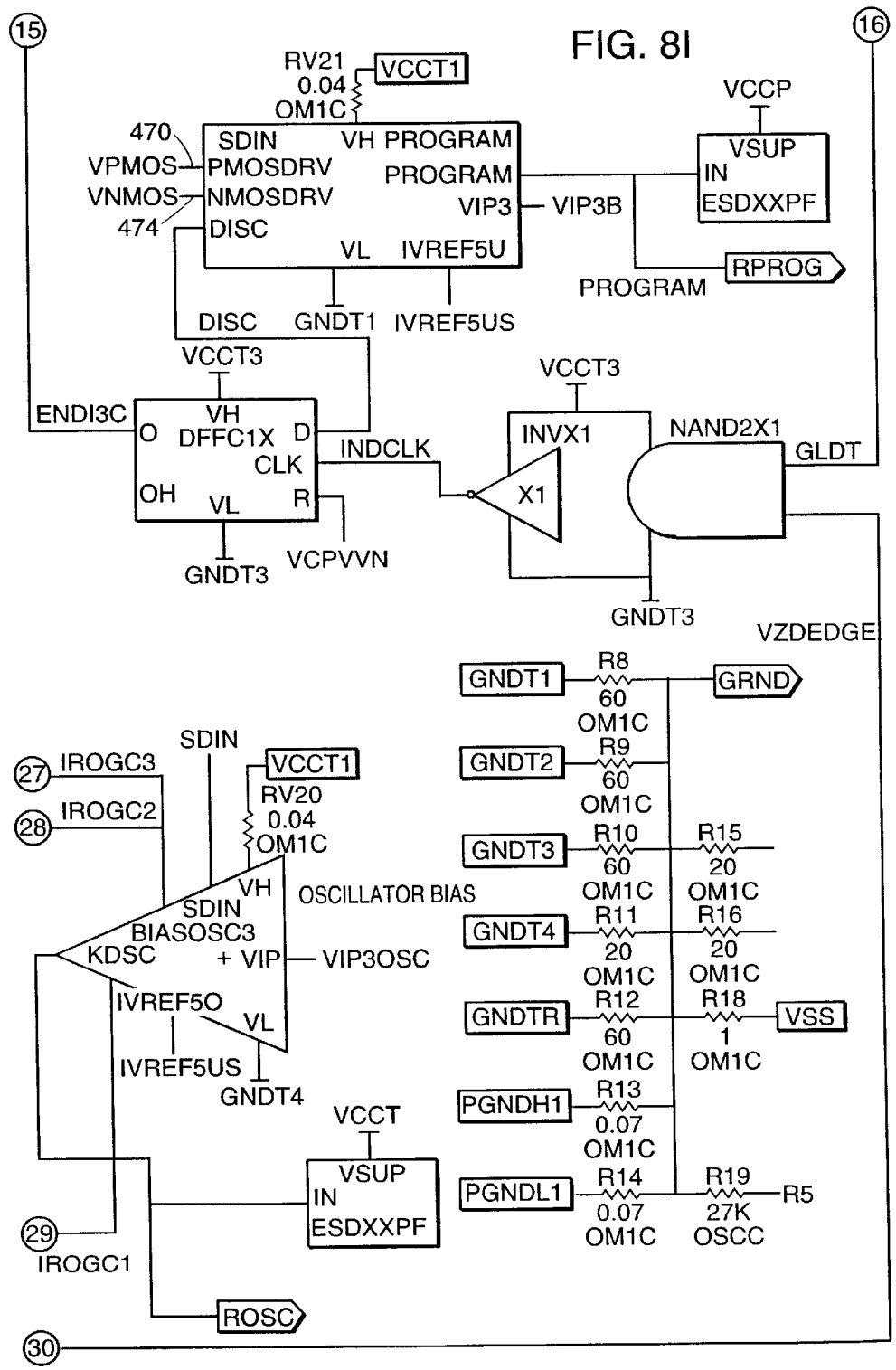

FIG. 8 illustrates another embodiment of an integrated circuit 450 to control a synchronous switching regulator. In this embodiment, the PWM logic module 454 receives the output signals from the high limit flip-flop 272, the low limit flip-flop 254, the PWM comparator 288 and a soft start comparator 384'. The PWM logic module 454 generates the signals applied to the reset input 146' and the set input 148" of the PWM flip-flop 292'. The enable signal used to synchronize the high limit flip-flop 272 is the clock signal 152, after inversion by inverter 458. The enable signal used to synchronize the low limit flip-flop 254 is the command signal 462 from the output of the PWM flip-flop 292', after inversion.

The command signal 140" and the inverted command signal 462 are generated by the PWM flip-flop 292' and received by the output logic module 116'. The output logic module 116' receives a VPMOS signal 470 indicating whether a p-channel device is being used for the high side switch connected to the high side gate driver output pin 388'. The output logic module also receives a VNMOS signal 474 indicating whether a n-channel device is being used for the high side switch connected to the high side gate driver output pin 388'.

EQUIVALENTS

The invention may be embodied in other specific forms without departing from the spirit or essential characteristics thereof. For example, all polarities of logic and voltage signals are shown to represent such polarities in a single functional embodiment. One skilled in the art can easily choose different polarities and arrange the specific components and logic accordingly. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

What is claimed is:

1. A method of controlling a switching regulator to regulate an output voltage, the method comprising:
   receiving a first enable signal and a second enable signal;
   comparing a feedback voltage representative of the output voltage to a first reference voltage and generating a first limit signal in response thereto;
   generating, in response to the first enable signal, a close switch command if the first limit signal indicates that the feedback voltage is less than the first reference voltage;
   comparing the feedback voltage to a second reference voltage and generating a second limit signal in response thereto; and
   generating, in response to the second enable signal, an open switch command if the second limit signal indicates that the feedback voltage is greater than the second reference voltage.

2. The method of claim 1 further comprising:
   comparing the feedback voltage to a third reference voltage and generating a threshold signal in response thereto; and
   inhibiting the close switch command if the threshold signal indicates that the feedback voltage is greater than the third reference voltage.

3. The method of claim 1 further comprising generating a switch control signal.

4. The method of claim 3 wherein the step of generating the switch control signal further comprises:
   receiving a clock signal;
   asserting a first state of the switch control signal in response to the clock signal;
   comparing the feedback voltage to a fourth reference voltage and generating a difference signal in response thereto;
   comparing the difference signal and a timed ramp signal; and
   asserting a second state of the switch control signal in response to the comparison of the difference signal and the timed ramp signal.

5. The method of claim 4 further comprising generating the first enable signal in response to the switch control signal.

6. The method of claim 4 further comprising generating the second enable signal in response to the clock signal.

7. The method of claim 3 further comprising receiving a switch type signal having a first state and a second state.

8. The method of claim 7 further comprising:
   converting the switch control signal into a drive signal compatible with a p-channel switching device in response to the first state of the switch type signal; and
   converting the switch control signal into a drive signal compatible with a n-channel switching device in response to the second state of the switch type signal.

9. The method of claim 3 further comprising using the switch control signal to control a synchronous switching regulator.

10. The method of claim 1 further comprising generating the first enable signal in response to a logical combination of a plurality of regulator signals.

11. The method of claim 1 further comprising generating the second enable signal in response to a logical combination of the plurality of regulator signals.

12. A method of controlling a switching regulator to regulate an output voltage, the method comprising:
   receiving an enable signal;
   comparing a feedback voltage representative of the output voltage to a first reference voltage and generating a limit signal in response thereto; and
   generating, in response to the enable signal, a close switch command if the limit signal indicates that the feedback voltage is less than the first reference voltage;
   comparing the feedback voltage to a second reference voltage and generating a threshold signal in response thereto; and
   inhibiting the close switch command if the threshold signal indicates that the feedback voltage is greater than the second reference voltage.

13. The method of claim 12 further comprising generating a switch control signal.

14. The method of claim 13 wherein the step of generating the switch control signal further comprises:
   receiving a clock signal;
   asserting a first state of the switch control signal in response to the clock signal;
   comparing the feedback voltage to a third reference voltage and generating a difference signal in response thereto;
   comparing the difference signal and a timed ramp signal; and asserting a second state of the switch control signal in response to the comparison of the difference signal and the timed ramp signal.

15. The method of claim 13 further comprising generating the enable signal in response to the switch control signal.

16. The method of claim 13 further comprising receiving a switch type signal having a first state and a second state.

17. The method of claim 16 further comprising:
converting the switch control signal into a drive signal compatible with a p-channel switching device in response to the first state of the switch type signal; and
converting the switch control signal into a drive signal compatible with a n-channel switching device in response to the second state of the switch type signal.

18. The method of claim 13 further comprising using the switch control signal to control a synchronous switching regulator.

19. The method of claim 12 further comprising generating the enable signal in response to a logical combination of a plurality of regulator signals.

20. A method of controlling a switching regulator to regulate an output voltage, the method comprising:
receiving an enable signal;
comparing a feedback voltage representative of the output voltage to a first reference voltage and generating a limit signal in response thereto; and
generating, in response to the enable signal, an open switch command if the limit signal indicates that the feedback voltage is greater than the first reference voltage; and
generating a switch control signal, wherein the step of generating the switch control signal further comprises:
receiving a clock signal;
asserting a first state of the switch control signal in response to the clock signal;
comparing the feedback voltage to a second referene voltage and generating a different signal in response thereto;
comparing the difference signal and timed ramp signal; and
asserting a second state of the switch control signal in response to the comparison of the difference signal and the timed ramp signal.

21. The method of claim 20 further comprising generating the enable signal in response to the clock signal.

22. The method of claim 20 further comprising receiving a switch type signal having a first state and a second state.

23. The method of claim 22 further comprising:
converting the switch control signal into a drive signal compatible with a p-channel switching device in response to the first state of the switch type signal; and
converting the switch control signal into a drive signal compatible with a n-channel switching device in response to the second state of the switch type signal.

24. The method of claim 20 further comprising using the switch control signal to control a synchronous switching regulator.

25. The method of claim 20 further comprising generating the enable signal in response to a logical combination of a plurality of regulator signals.

26. A system for controlling a switching regulator to regulate an output voltage, the system comprising:
a main control module comprising a main control module output terminal, a main control module input terminal configured to receive a feedback voltage representative of the regulated output voltage, a main control module clock terminal configured to receive a master clock signal, a main control module ramp input terminal configured to receive a timed ramp signal and a reference input terminal configured to receive a first reference signal representative of a regulation value of the feedback voltage;
a high limit module comprising an output terminal, a first input terminal in communication with the main control module input terminal, a reference input terminal configured to receive a second reference signal representative of a high limit and a timing input terminal in communication with the main control module clock terminal;
a low limit module comprising an output terminal, an input terminal in communication with the main control module input terminal, a first reference input terminal configured to receive a third reference signal representative of a low limit and a timing input terminal in communication with the main control module output terminal; and
an output logic module comprising a first input terminal in communication with the main control module output terminal, a second input terminal in communication with the high limit module output terminal, a third input terminal in communication with the low limit module output terminal, and an output terminal for providing a switch command signal to control the switching regulator.

27. The system of claim 25 wherein the low limit module further comprises:
a first comparator comprising an output terminal, a first input terminal in communication with the first reference input terminal of the low limit module and a second input terminal in communication with the first input terminal of the low limit module; and
a flip-flop comprising an input terminal in communication with the output terminal of the first comparator, a timing input terminal in communication with the timing input terminal of the low limit module, a reset terminal and an output terminal in communication with the output terminal of the low limit module.

28. The system of claim 27 wherein the low limit module further comprises a second reference input terminal configured to receive a fourth reference signal representative of a threshold limit.

29. The system of claim 28 wherein the low limit module further comprises:
a second comparator comprising a first input terminal in communication with the second reference input terminal of the low limit module, a second input terminal in communication with the input terminal of the low limit module and an output terminal in communication with the reset terminal of the flip-flop.

30. The system of claim 26 wherein the high limit module further comprises:
a comparator comprising an output terminal, a first input terminal in communication with the reference input terminal of the high limit module and a second input terminal in communication with the first input terminal of the high limit module; and
a flip-flop comprising an input terminal in communication with the output terminal of the comparator, a timing input terminal in communication with the timing input terminal of the high limit module and an output terminal in communication with the output terminal of the high limit module.

31. The system of claim 26 wherein the output logic module further comprises:
- an AND gate comprising an output terminal, a first input terminal in communication with the first input terminal of the output logic module and an inverting input terminal in communication with the second input terminal of the output logic module; and
- an OR gate comprising a first input in communication with the third input terminal of the output logic module, a second input terminal in communication with the output terminal of the AND gate and an output terminal in communication with the output terminal of the output logic module.

32. The system of claim 26 wherein the main control module further comprises:
- an amplifier comprising an output terminal, a first input terminal in communication with the main control module input terminal, a second input terminal in communication with the reference input terminal of the main control module and;
- a compensation network comprising a first terminal in communication with the output terminal of the amplifier and a second terminal in communication with a voltage node;
- a comparator comprising an output terminal, a first input terminal in communication with the output terminal of the amplifier and a second input terminal in communication with the main control module ramp input terminal; and
- a flip-flop comprising a set terminal in communication with the main control module clock terminal, a reset terminal in communication with the output terminal of the comparator and an output terminal in communication with the main control module output terminal.

33. The system of claim 26 wherein the high limit module further comprises a filter in communication with the first input terminal of the high limit module.

34. The system of claim 26 wherein the low limit module further comprises a filter in communication with the first input terminal of the low limit module.

35. A system for controlling a switching regulator to regulate an output voltage, the system comprising:
- a means for receiving a first enable signal and a second enable signal;
- a means for comparing a feedback voltage representative of the output voltage to a first reference voltage and generating a first limit signal in response thereto;
- a means for generating, in response to the first enable signal, a close switch command if the first limit signal indicates that the feedback voltage is less than the first reference voltage;
- a means for comparing the feedback voltage to a second reference voltage and generating a second limit signal in response thereto; and
- a means for generating, in response to the second enable signal, an open switch command if the second limit signal indicates that the feedback voltage is greater than the second reference voltage.

36. The system of claim 35 further comprising:
- a means for comparing the feedback voltage to a third reference voltage and generating a threshold signal in response thereto; and
- a means for inhibiting the close switch command if the threshold signal indicates that the feedback voltage is greater than the third reference voltage.

37. A system of controlling a switching regulator to regulate an output voltage, the system comprising:
- a means for receiving an enable signal;
- a means for comparing a feedback voltage representative of the output voltage to a first reference voltage and generating a limit signal in response thereto;
- a means for generating, in response to the enable signal, a close switch command if the limit signal indicates that the feedback voltage is less than the first reference voltage;
- a means for comparing the feedback voltage to a second reference voltage and generating a threshold signal in response thereto; and
- a means for inhibiting the close switch command if the threshold signal indicates that the feedback voltage is greater than the second reference voltage.

* * * * *

UNITED STATES PATENT AND TRADEMARK OFFICE
CERTIFICATE OF CORRECTION

PATENT NO.    : 6,512,353 B2
DATED         : January 28, 2003
INVENTOR(S)   : Sanzo et al.

It is certified that error appears in the above-identified patent and that said Letters Patent is hereby corrected as shown below:

<u>Column 18,</u>
Line 45, delete "and".

<u>Column 20,</u>
Line 29, replace "25" with -- 26 --.

Signed and Sealed this

Twenty-ninth Day of April, 2003

JAMES E. ROGAN
*Director of the United States Patent and Trademark Office*